(12) United States Patent
Barker et al.

(10) Patent No.: US 10,170,212 B2
(45) Date of Patent: Jan. 1, 2019

(54) METAL-CONTAINING COMPOUNDS

(71) Applicant: FARADION LIMITED, Sheffield (GB)

(72) Inventors: Jeremy Barker, Chipping Norton (GB); Richard Heap, Oxford (GB)

(73) Assignee: FARADION LIMITED, Sheffield (GB)

( * ) Notice: Subject to any disclaimer, the term of this patent is extended or adjusted under 35 U.S.C. 154(b) by 85 days.

(21) Appl. No.: 14/655,892

(22) PCT Filed: Dec. 16, 2013

(86) PCT No.: PCT/GB2013/053311
§ 371 (c)(1),
(2) Date: Jun. 26, 2015

(87) PCT Pub. No.: WO2014/102531
PCT Pub. Date: Jul. 3, 2014

(65) Prior Publication Data
US 2016/0204436 A1    Jul. 14, 2016

(30) Foreign Application Priority Data
Dec. 28, 2012    (GB) .................................. 1223473.8

(51) Int. Cl.
| H01B 1/06 | (2006.01) |
|---|---|
| C01B 25/26 | (2006.01) |
| C01B 25/30 | (2006.01) |
| C01B 25/37 | (2006.01) |
| C01B 25/39 | (2006.01) |
| C01B 25/42 | (2006.01) |
| C01B 25/45 | (2006.01) |
| H01M 4/58 | (2010.01) |
| H01M 10/054 | (2010.01) |
| H01M 4/136 | (2010.01) |
| H01M 4/1397 | (2010.01) |
| H01M 10/05 | (2010.01) |
| H01M 10/052 | (2010.01) |

(52) U.S. Cl.
CPC ............. H01B 1/06 (2013.01); C01B 25/265 (2013.01); C01B 25/30 (2013.01); C01B 25/37 (2013.01); C01B 25/39 (2013.01); C01B 25/425 (2013.01); C01B 25/45 (2013.01); H01M 4/136 (2013.01); H01M 4/1397 (2013.01); H01M 4/5825 (2013.01); H01M 10/05 (2013.01); H01M 10/052 (2013.01); H01M 10/054 (2013.01); C01P 2002/72 (2013.01); C01P 2006/40 (2013.01)

(58) Field of Classification Search
CPC ...... H01B 1/06; H01M 4/5825; H01M 4/136; H01M 4/1397; H01M 10/05; H01M 10/052; H01M 10/054; C01B 25/265; C01B 25/37; C01B 25/372; C01B 25/275; C01B 25/377; C01B 25/39; C01B 25/395; C01B 25/41; C01B 25/42; C01B 25/425; C01B 25/45; C01B 25/451; C01B 25/455
See application file for complete search history.

(56) References Cited

U.S. PATENT DOCUMENTS

| 4,246,253 A | 1/1981 | Hunter |
|---|---|---|
| 5,135,732 A | 8/1992 | Barboux et al. |
| 5,939,039 A * | 8/1999 | Sapieszko ............ A61K 6/0273 423/305 |
| 6,203,946 B1 | 3/2001 | Barker et al. |
| 6,387,568 B1 | 5/2002 | Barker et al. |
| 6,872,492 B2 * | 3/2005 | Barker .................. C01B 25/455 429/231.2 |
| 2008/0032194 A1 | 2/2008 | Nakai et al. |
| 2009/0117022 A1 * | 5/2009 | Nuspl ..................... C01B 25/45 423/306 |
| 2010/0105926 A1 * | 4/2010 | Hibst ..................... B01J 23/002 549/256 |
| 2010/0283012 A1 * | 11/2010 | Hibst ..................... C01B 25/45 252/506 |
| 2011/0037032 A1 * | 2/2011 | Hibst ..................... C01B 25/45 252/507 |
| 2011/0052986 A1 * | 3/2011 | Barker ................ H01M 4/5825 429/220 |
| 2011/0147671 A1 * | 6/2011 | Bramnik ................ C01B 25/45 252/507 |
| 2011/0272639 A1 * | 11/2011 | Bramnik ................ C01B 25/45 252/506 |
| 2012/0012797 A1 * | 1/2012 | Bramnik ............. H01M 4/5825 252/506 |
| 2012/0061612 A1 | 3/2012 | Yoshioka et al. |
| 2012/0064397 A1 * | 3/2012 | Kallfass .................. C01B 25/45 429/202 |
| 2012/0231334 A1 * | 9/2012 | Kinoshita ............. B82Y 30/00 429/211 |

FOREIGN PATENT DOCUMENTS

| EP | 2546194 A1 * | 1/2013 | ............. C01B 25/37 |
|---|---|---|---|
| JP | WO 2011111628 A1 * | 9/2011 | ............. C01B 25/37 |

OTHER PUBLICATIONS

Padhi, et al., "Phospho-olivines as Positive-Electrode Materials for Rechargeable Lithium Batteries," J. Electrochem. Soc., Apr. 1997, vol. 144, No. 4, pp. 1188-1194.

(Continued)

Primary Examiner — Harold Y Pyon
Assistant Examiner — Matthew R Diaz
(74) Attorney, Agent, or Firm — Meunier Carlin & Curfman LLC

(57) ABSTRACT

The invention relates to a novel solid state process for the preparation of metal-containing compounds comprising the steps i) forming a reaction mixture comprising one or more metal-containing precursor compounds and optionally one or more non-metal-containing reactants, and ii) using one or more hypophosphite-containing materials as a reducing agent; wherein one or more of the hypophosphite-containing materials is used as an agent to reduce one or more of the metal-containing precursor compounds; and further wherein the process is performed in the absence of an oxidizing atmosphere. Materials made by such a process are useful, for example, as electrode materials in alkali metal-ion battery applications.

13 Claims, 26 Drawing Sheets

(56) References Cited

OTHER PUBLICATIONS

Toprakci, et al., "Fabrication and Electrochemical Characteristics of LiFePO$_4$ Powders for Lithium-Ion Batteries," KONA Powder and Particle Journal, 2010, No. 28, pp. 50-73.
Shi, et al., "New synthesis method for nickel phosphide nanoparticles: solid phase reaction of nickel cations with hypophosphites," J. Mater. Chem., 2009, vol. 19, pp. 2295-2297.
Song, et al., "Synthesis of highly active and porous NiCoP catalysts via directly thermal treatment of a mechanical mixing of nickel, cobalt salts and sodium hypophosphite," Powder Technology, 2011, vol. 212, pp. 367-371.
Guan, et al., "Alternative synthesis of bulk and supported nickel phosphide from the thermal decomposition of hypophosphites," Journal of Catalysis, 2009, vol. 263, pp. 1-3.
Rho, et al. "Surface Chemistry of LiFePO$_4$ Studied by Mössbauer and X-Ray Photoelectron Spectroscopy and Its Effect on Electrochemical Properties," J. Electrochem. Soc., 2007, vol. 154, No. 4, pp. A283-A289.
Great Britain Intellectual Property Office Combined Search Report and Examination Report for Great Britain Patent Application No. GB1223473.8.
International Search Report and Written Opinion, dated Jul. 4, 2014, in International Application No. PCT/GB2013/053311.
Response to International Search Report and Written Opinion pursuant to PCT Article 19, dated Sep. 4, 2014, in International Application No. PCT/GB2013/053311.
Written Opinion of the International Preliminary Examining Authority, dated Dec. 12, 2014, in International Application No. PCT/GB2013/053311.
International Preliminary Report on Patentability, dated Mar. 27, 2015, and Applicant's Response to Notification Concerning Informal Communications, dated Feb. 19, 2015, in International Application No. PCT/GB2013/053311.

\* cited by examiner

US 10,170,212 B2

METAL-CONTAINING COMPOUNDS

FIELD OF THE INVENTION

The present invention relates to a novel process for the preparation of metal-containing compounds and to the use of these in electrodes for energy storage devices and the like.

BACKGROUND OF THE INVENTION

Lithium-ion battery technology has enjoyed a lot of attention in recent years and provides the preferred portable battery for most electronic devices in use today. Such batteries are "secondary" or rechargeable which means they are capable of undergoing multiple charge/discharge cycles. Typically lithium-ion batteries are prepared using one or more lithium electrochemical cells containing electrochemically active materials. Such cells comprise an anode (negative electrode), a cathode (positive electrode) and an electrolyte material. When a lithium-ion battery is charging, $Li^+$ ions de-intercalate from the cathode and insert into the anode. Meanwhile charge balancing electrons pass from the cathode through the external circuit containing the charger and into the anode of the battery. During discharge the same process occurs but in the opposite direction.

Various electrochemically active materials have been suggested for use as the cathode materials, for example $LiCoO_2$, $LiMn_2O_4$ and $LiNiO_2$, see U.S. Pat. No. 5,135,732 and U.S. Pat. No. 4,246,253. However these materials exhibit problems, for example cycle fading (depletion in charge capacity over repeated charge/discharge cycles), which make them commercially unattractive. Attempts to address cycle fading have led to lithium metal phosphate and lithium metal fluorophosphates becoming favourable materials. Such materials were first reported in U.S. Pat. No. 6,203,946, U.S. Pat. No. 6,387,568, and by Goodenough et al. in "Phospho-olivines as Positive-Electrode Materials for Rechargeable Lithium Batteries", Journal of Electrochemical Society, (1997) No. 144, pp 1188-1194.

Many workers have tried to provide economical and reproducible synthesis methods for phosphate-containing materials, and especially for high performance (optimised) phosphate-containing materials. A review of the prior art methods which describe the preparation of one particular lithium metal phosphate, namely, lithium iron phosphate ($LiFePO_4$), is given by X. Zhang et al in "Fabrication and Electrochemical Characteristics of $LiFePO_4$ Powders for Lithium-Ion Batteries", KONA Powder and Particle Journal No. 28 (2010) pp 50-73. As this review demonstrates, a lot of effort has been expended since lithium iron phosphate was first identified in 1997, to find the most expedient method for producing a $LiFePO_4$ material with the best all round performance; for example solid-state synthesis using mechanochemical activation to increase the activation of the starting materials, microwave heating to control the particle size of the active cathode material, and carbothermal reduction which enables Fe(III) e.g. in the form of $Fe_2O_3$ or $FePO_4$ (i.e. cheap and readily available sources of iron) to be used as a precursor material. The carbothermal reduction process is a high-temperature reduction reaction (typically 550° C. to 850° C.) which commonly utilizes carbon black, graphite or pyrolyzed organic chemicals as the source of carbon reducing agent. Carbothermal reduction is a highly endothermic reaction; hence the reaction temperature must be sufficient to drive the reaction. In addition, since solid carbon is used as the reducing agent, all the precursors and reactants must be kept in good contact throughout the reaction, nevertheless as reported in the review mentioned above, carbothermal reduction is excellent for the reduction of Fe(III), the stabilization of Fe(II), the control of particle morphology, and the enhancement of electrical conductivity by coating $LiFePO_4$ with residual carbon.

Particulate reducing agents other than carbon, specifically silicon oxide, titanium oxide and elemental metals such as Fe, Co, Ni, Mn, Cu, V, Ti, Cr, Nb, Mo, Mg, Ca, Zn, Sr, Pb, Cd, Sn, Ba, Be, Al and B are disclosed in EP1 343 720.

More recently US 2012/0061612 A1 discloses the synthesis of olivine-type lithium-containing phosphate compounds ($LiMPO_4$) using a phosphorus-source such as at least one selected from phosphates, hypophosphites, phosphites and metaphosphates. The described reaction process involves a two stage firing regime, in which a first firing step is conducted at a temperature of higher than 400° C. and is for the removal of the volatile components. Preferably this first firing step is conducted in an atmosphere that contains 1 volume % or more of oxygen, and to support this all of the Specific Examples in this prior art are conducted under an air atmosphere. No Specific Examples using a hypophosphite are given however, and if hypophosphite were to be used in air or a 1 volume % oxygen atmosphere, one would discover that under these conditions the hypophosphite materials would oxidize to a phosphate material and that such a phosphate would have no effect in the process of the present invention.

The most interesting cathode materials are those which have large charge capacity, are capable of good cycling performance, highly stable, and of low toxicity and high purity. To be commercially successful, the cathode materials must also be easily and affordably produced. This long list of requirements is difficult to fulfil but, as detailed in the review mentioned above, the active materials most likely to succeed are those with small particle size and narrow size distribution, with an optimum degree of crystallinity, a high specific surface area and with uniform morphology.

Materials containing hypophosphite ions ($H_2PO_2^-$), such as sodium hypophosphite ($NaH_2PO_2$) and ammonium hypophosphite ($NH_4H_2PO_2$) are available very cheaply and widely used as the in-situ reducing agent for electroless plating baths; they reduce metal salts (e.g. nickel salts) to elemental metal (e.g. Ni) in the plating process. Other agents, for example materials containing hydrosulfite ions, such as sodium hydrosulfite ($Na_2S_2O_4$) (also referred to as sodium hyposulfite and sodium dithionite), sodium sulfite ($Na_2SO_3$), formaldehyde, dimethyl amine borane (DMAB), hydrazine, aliphatic alcohols, trimethyl borane, and borohydride materials are also known to be powerful reducing agents.

The present invention aims to provide a fast, reliable and cost effective process for the preparation of metal-containing compounds and including but not limited to alkali metal-containing compounds. Advantageously, the process of the present invention aims to provide metal-containing compounds that meet the structural and alkali ion insertion properties needed for commercially viable cathode active materials. To this end, the present invention provides a solid state process for the preparation of a metal-containing compound comprising using a reaction mixture comprising i) one or more hypophosphite-containing materials and ii) one or more metal-containing precursor compounds.

In particular the present invention provides a solid state process for the preparation of a metal-containing compound comprising forming a reaction mixture comprising i) one or more metal-containing precursor compounds and optionally one or more non-metal-containing reactants and ii) one or more hypophosphite-containing materials; wherein one or more of the hypophosphite-containing materials is used as an agent to reduce one or more of the metal-containing precursor compounds; and further wherein the process is performed in the absence of an oxidising atmosphere.

The one or more metal-containing precursor compounds and the one or more metal-containing compounds preferably comprise one or more metals selected from alkali metals, transition metals, non-transition metals, alkaline earth metals and metalloids. In the context of this invention the term "metalloid" is an element with both metal and non-metal characteristics.

Ideally, the present invention provides a solid state process in which the metal-containing compound comprises one or more metals which have an average oxidation state which is lower than the average oxidation state of the one or more metals in the metal-containing precursor compounds. Further ideally, one or more of the metal-containing compounds and metal-containing precursor compounds comprise one or more transition metals. In this latter case, during the process of the present invention, one or more of the transition metals in the metal-containing precursor compounds is reduced by one or more of the hypophosphite-containing materials to yield a metal-containing compound with one or more transition metals with a lower average oxidation state than the average oxidation state of the one or more transition metals in the metal-containing precursor compounds.

In a highly preferred solid state process, the present invention produces compounds containing one or more alkali metals. Such compounds include alkali metal (metal)-containing compounds and may be produced for example by forming a reaction mixture comprising i) one or more metal-containing precursor compounds comprising alkali metals and optionally further metal-containing precursor compounds comprising one or more metals selected from transition metals and/or non transition metals and/or alkaline earth metals and/or metalloids, and further optionally one or more non-metal-containing reactants, and ii) one or more hypophosphite-containing materials; wherein one or more of the hypophosphite-containing materials are used as an agent to reduce one or more of the metal-containing precursor compounds; and further wherein the process is performed in the absence of an oxidising atmosphere.

The further metal-containing precursor compounds that comprise one or more metals selected from transition metals and/or non transition metals and/or alkaline earth metals and/or metalloids may also be used especially, but not exclusively, when the alkali metal-containing precursor compound does not already comprise a transition metal, and/or non-transition metal and/or alkaline earth metal and/or metalloid.

As described below, the alkali metal(metal)-containing compounds may alternatively be produced by forming a reaction mixture comprising one or more metal-containing precursor compounds and further optionally one or more non-metal-containing reactants, and ii) one or more alkali metal hypophosphite-containing materials; wherein one or more of the alkali metal hypophosphite-containing materials are used as an agent to reduce one or more of the metal-containing precursor compounds and to provide a source of alkali metal in the alkali metal (metal)-containing compounds; and further wherein the process is performed in the absence of an oxidising atmosphere.

A preferred solid state process of the present invention produces a metal-containing compound of the formula:

$$A_aM_b(X_cY_d)_eZ_f$$

and comprises the step of forming a mixture comprising i) one or more metal-containing precursor compounds and optionally one or more non-metal-containing reactants, and ii) one or more hypophosphite-containing materials;

wherein:

A is an alkali metal selected from one or more of lithium, sodium and potassium;

M comprises one or more metals selected from transition metals, non-transition metals and metalloids;

$(X_cY_d)_e$ is at least one first anion; and

Z is at least one second anion wherein a≥0; b>0; c>0; d≥0; e>0 and f≥0;

wherein a, b, c, d, e and f are chosen to maintain electroneutrality;

and wherein one or more of the hypophosphite-containing materials is used as an agent to reduce at least a portion of one or more of the metal-containing precursor compounds;

and further wherein the process is performed in the absence of an oxidising atmosphere.

Desirably, the solid state process of the present invention produces a metal-containing compound, for example of the formula $A_aM_b(X_cY_d)_eZ_f$ in which M comprises one or more transition metals and/or non transition metals and/or alkaline earth metals and/or metalloids which have an average oxidation state which is lower than the average oxidation state of the one or more metals (transition metals and/or non transition metals and/or alkaline earth metals and/or metalloids) in the metal-containing precursor compounds.

The most preferred metal-containing compounds produced by the solid state process of the present invention are of the formula:

$$A_aM_b(X_cY_d)_eZ_f$$

wherein:

A is an alkali metal selected from one or more of lithium, sodium and potassium;

M comprises one or more transition metals and optionally one or more further metals selected from non-transition metals and metalloids;

$(X_cY_d)_e$ is at least one first anion; and

Z is at least one second anion wherein a≥0; b>0; c>0; d≥0; e>0 and f≥0;

wherein a, b, c, d, e and f are chosen to maintain electroneutrality;

and wherein the process comprises forming a mixture comprising i) one or more metal-containing precursor compounds and optionally one or more non-metal-containing reactants, and ii) one or more hypophosphite-containing materials; wherein one or more of the hypophosphite-containing materials is used as an agent to reduce one or more of the metal-containing precursor compounds;

and further wherein the process is performed in the absence of an oxidising atmosphere.

The addition of one or more hypophosphite-containing materials as a reducing agent (e.g. they reduce the oxidation state of the metal, particularly a transition metal, of the metal-containing precursor compounds), is crucial to the success of the invention and depending upon the particular one or more metal-containing precursor compounds, and the desired final product, the hypophosphite-containing materials may additionally behave as a source of phosphorus in the final product and/or as a source of the alkali metal. For example, when the target metal-containing compound contains sodium and phosphorus, both of these elements may potentially be obtained from sodium hypophosphite when the latter is used as the reducing agent. The fact that the one or more hypophosphite-containing materials potentially acts as both the reducing agent and/or as a source of phosphorus and/or as a source of alkali metal in the metal-containing compound is seen as one of the many advantages of the present invention.

In a particularly preferred process, alkali metal (metal)-containing compounds are prepared. Such compounds may have the formula $A_aM_b(X_cY_d)_eZ_f$ where A is one or more alkali metals, M comprises one or more transition metals and/or one or more non transition metals and/or one or more alkaline earth metals and/or one or more metalloids, and X, Y, and Z are as defined below. In such alkali metal (metal)-containing compounds, $a>0$, $b>0$, $d≥0$, $e>0$ and $f≥0$.

In the reaction products produced by the solid state process of the present invention:

A preferably comprises one or more alkali metals selected from sodium, lithium and potassium;

M comprises one or more metals selected from transition metals such as titanium, vanadium, niobium, tantalum, hafnium, chromium, molybdenum, tungsten, manganese, iron, osmium, cobalt, nickel, palladium, platinum, copper, silver, gold, zinc, cadmium, aluminum, scandium, yttrium, zirconium, technetium, rhenium, ruthenium, rhodium, iridium, mercury, gallium, indium, tin, lead, bismuth and selenium, non transition metals and alkaline earth metals such as magnesium, calcium, beryllium, strontium and barium, and metalloids such as boron, silicon, germanium, arsenic, antimony and tellurium;

X comprises one or more elements selected from titanium, vanadium, chromium, arsenic, molybdenum, tungsten, niobium, manganese, aluminum, selenium, boron, oxygen, carbon, silicon, phosphorus, nitrogen, sulfur, fluorine, chlorine, bromine and iodine.

Y comprises one or more halides, sulfur-containing groups, oxygen-containing groups and mixtures thereof;

Z is selected from one or more halides, hydroxide-containing groups and mixtures thereof.

Any hypophosphite-containing materials may be used in the present invention, however, preferably they are any one or a mixture of materials selected from lithium hypophosphite ($LiH_2PO_2$), sodium hypophosphite ($NaH_2PO_2$), ammonium hypophosphite ($NH_4H_2PO_2$) and hypophosphorus acid ($H_3PO_2$). The most preferred materials comprise sodium hypophosphite ($NaH_2PO_2$) and/or ammonium hypophosphite ($NH_4H_2PO_2$).

Desirable compounds of the formula $A_aM_b(X_cO_d)_eZ_f$ include, but are not limited to, those in which A is lithium and/or sodium, and in which the first anion $(X_cY_d)_e$ comprises one or more groups, preferably selected from phosphate, condensed polyphosphate, sulfate, oxide, thiosulfate, sulfite, chlorate, bromate, oxyhalide, halide, silicate, arsenate, selenate, molybdate, vanadate groups and any oxyanion groups.

Compounds where X comprises phosphorus, for example in which $(X_cY_d)_e$ is a $PO_4$ and/or $P_2O_7$ moiety are especially preferred. Similarly, compounds in which X comprises sulfur are equally advantageous, such as those containing $SO_4$ moieties.

Other favourable materials include:
$LiFePO_4$,
$LiFePO_4/Fe_2P$,
$LiMnPO_4$,
$LiCoPO_4$,
$LiNiPO_4$,
$NaFePO_4$,
$NaMnPO_4$,
$NaCoPO_4$,
$NaNiPO_4$,
$LiMn_{0.5}Fe_{0.2}Mg_{0.3}PO_4$,
$Li_3V_2(PO_4)_3$,
$Na_4Fe_3(PO_4)_2P_2O_7$,
$Na_3V_2(PO_4)_3$,
$LiMn_{0.5}Fe_{0.5}PO_4$,
$Na_7V_4(P_2O_7)_4PO_4$,
$Na_7V_3(P_2O_7)_4$,
$Na_2Fe(SO_4)_2$,
$NaVPO_4F$,
$LiVPO_4F$,
$Na_3V(PO_4)_2$,
$Li_3V(PO_4)_2$,
$NaVOPO_4$,
$LiVOPO_4$,
$LiV_2O_5$,
$NaV_2O_5$,
$NaVO_2$,
$VPO_4$,
$MoP_2O_7$,
$MoOPO_4$,
$Fe_3(PO_4)_2$,
$Na_{8-2x}Fe_{4+x}(P_2O_7)_4$,
$Na_{8-2x}Mn_{4+x}(P_2O_7)_4$,
$Na_2MnP_2O_7$,
$Na_2FeP_2O_7$,
$Na_2CoP_2O_7$,
$Na_4Mn_3(PO_4)_2P_2O_7$,
$Na_4Co_3(PO_4)_2P_2O_7$,
$Na_4Ni_3(PO_4)_2P_2O_7$,
$NaFeSO_4F$,
$LiFeSO_4F$,
$NaMnSO_4F$,
$LiMnSO_4F$,
$Na_2FePO_4F$,
$Na_2MnPO_4F$,
$Na_2CoPO_4F$,
$Na_2NiPO_4F$,
$Na_2Fe_2(SO_4)_3$,
$Li_2Fe_2(SO_4)_3$, and
$Li_2Fe(SO_4)_2$.

Advantageously, the present invention provides a solid state process for the preparation of metal phosphate-containing materials ($MPO_4$) comprising using one or more hypophosphite-containing materials, (for example sodium hypophosphite ($NaH_2PO_2$) and/or ammonium hypophosphite ($NH_4H_2PO_2$)) as an agent to reduce at one or more metal-containing precursor compounds and optionally also as a source of phosphorus; wherein the process is performed in the absence of an oxidising atmosphere.

In particular, the present invention provides a solid state process for the preparation of a compound comprising an alkali metal (metal) phosphate of the general formula: $AMPO_4$, where A comprises one or more alkali metals; M comprises a metal selected from one or more of manganese, iron, cobalt, copper, zinc, nickel, magnesium and calcium, the process comprising forming a mixture of i) one or more metal-containing precursor compounds and optionally one or more non-metal-containing reactants and ii) one or more hypophosphite-containing materials; wherein one or more of the hypophosphite-containing materials is used as an agent for reducing at least a portion of one or more of the metal-containing precursor compounds and optionally also as a source of phosphorus and/or source of alkali metal; further wherein the process is performed in the absence of an oxidising atmosphere.

Preferred $AMPO_4$-containing compounds include $NaMPO_4$ and $LiMPO_4$; $LiFePO_4$-containing compounds are particularly preferred. These compounds may be produced in the solid state process of the present invention by forming a mixture comprising i) one or more metal-containing precursor compounds and optionally one or more non-metal-containing reactants; and ii) one or more hypophosphite-containing materials; wherein one or more of the hypophosphite-containing materials are used as an agent to reduce one or more of the metal-containing precursor compounds, wherein component i) of the mixture may comprise one or more compounds selected from $LiH_2PO_4$, $Li_2HPO_4$, $LiOH$, $LiOH \cdot H_2O$, $Fe_3O_4$, $Fe_2O_3$, $Li_2CO_3$, $FePO_4 \cdot x\ H_2O$, $FePO_4$, $Fe_3(PO_4)_2$, $FeSO_4 \cdot x\ H_2O$, $Fe(NO_3)_3$, $Fe(CH_3CO_2)_2$, $C_6H_8O_7 \cdot x\ Fe^{3+} \cdot y\ NH_3$ (ammonium iron (III) citrate), $C_6H_5FeO_7$ (iron (III) citrate) and $Fe(C_5H_7O_2)_3$ (iron (III) 2,4-petanedionate) and further wherein the process is performed in the absence of an oxidising atmosphere.

$NaMPO_4$ may be produced via a similar reaction process wherein the metal-containing precursor compounds may comprise one or more compounds selected from $NaH_2PO_4$, $Na_2HPO_4$, $NaOH$, $Fe_3O_4$, $Fe_2O_3$, $Na_2CO_3$, $FePO_4 \cdot x\ H_2O$, $FePO_4$, $Fe_3(PO_4)_2$, $FeSO_4 \cdot x\ H_2O$, $Fe(NO_3)_3$, $Fe(CH_3CO_2)_2$, $C_6H_8O_7 \cdot x\ Fe^{3+} \cdot y\ NH_3$ (ammonium iron (III) citrate), $C_6H_5FeO_7$ (iron (III) citrate) and $Fe(C_5H_7O_2)_3$ (iron (III) 2,4-petanedionate)

The reaction mixture in either case may also include any other suitable reagents and/or sources of phosphorus such as $H_3PO_4$, $(NH_4)_2HPO_4$, $(NH_4)H_2PO_4$.

A convenient way to perform the solid-state process of the present invention is by:

1. forming a mixture comprising i) one or more metal-containing precursor compounds and optionally one or more non-metal-containing reactants, and ii) one or more hypophosphite-containing materials;
2. heating the mixture under a non-oxidizing atmosphere; and
3. recovering the resultant product, preferably a metal-containing compound of the formula:

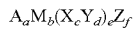
$$A_a M_b (X_c Y_d)_e Z_f$$

wherein A is one or more alkali metals selected from lithium, sodium and potassium, M comprises one or more metals selected from transition metals, non transition metals, alkaline earth metals and metalloids, $(X_c Y_d)_e$ is at least one first anion and z is at least one second anion, and wherein $a \geq 0$, $b > 0$, $c > 0$, $d \geq 0$, $e > 0$ and $f \geq 0$.

Ideally the starting materials are intimately admixed in particulate form. This can be achieved using various methods, for example by finely grinding the materials separately using a pestle and mortar or a ball mill, and then mixing them together, or the materials can be admixed whilst they are being finely ground. The grinding and admixing is of sufficient duration to produce a uniformly intermixed finely ground powder. A solvent such as acetone or another material which is easily removed, for example a low boiling liquid, can be used to assist the grinding/admixing process and this is preferably removed prior to the heating step. Other known techniques such as high energy ball milling and microwave activation may also be used to help prepare the starting materials, for example to increase their reactivity.

A key feature of the present invention is that it is a "solid-state" reaction i.e. a reaction in which all of the reactants are in solid form and are substantially free of any reaction medium such as a solvent. Where a solvent or other low boiling liquid is used to assist the mixing of the reactants, as described above, it is substantially removed prior to the heating step. Based on prior art knowledge, it is known that hypophosphite-containing materials are useful reducing agents when employed in alkaline solution reactions, particularly as the soluble chemical reducing agent in electroless nickel and copper baths. However, the use of hypophosphite-containing materials is not yet known for the reduction of metals to intermediate oxidation states (i.e. not to the metallic state), and it is as yet unknown that they are effective reducing agents for metals, particularly transition metals, other than copper and nickel. Moreover, it is highly surprising that hypophosphite-containing materials are effective reducing agents in solid state reactions, and that in such reactions they can also provide some or all of the phosphate and/or the alkali metal component of phosphate- and/or alkali metal-containing products.

The reaction between the starting materials generally occurs during the heating step of the process. This typically involves heating the reaction mixture either at a single temperature, or over a range of temperatures, for example up to at least 150° C., preferably up to at least 200° C. A single or a range of reaction temperatures of from 150° C. to 1200° C. is preferred with from 150° C. to 800° C. being particularly preferred.

Conveniently the reaction is performed under atmospheric pressure and it must be conducted under a non-oxidising atmosphere, for example nitrogen, argon or another inert gas, or under vacuum, and depending on the target material and the precursors used, the reaction may also be performed in a sealed reaction vessel. All of these reaction such conditions are within the scope of the present invention and are all to be included in the definition of "non-oxidizing atmosphere" and/or "absence of an oxidizing atmosphere".

Advantageously, the reaction temperature is maintained for between 0.5 and 12 hours, although the exact time will depend on the reactivity of the starting materials. Between 0.5 and 8 hours has been found to be sufficient for many reactions utilising the process of the present invention.

As discussed above, in the process of the present invention the one or more hypophosphite-containing materials are agents for the reduction of the average oxidation state of the metal (transition metal and/or non transition metal and/or alkaline earth metal and/or metalloid) in the one or more metal-containing precursor compounds, and may additionally provide a source of phosphorus and/or a source of alkali metal.

In a preferred reaction scheme, lithium iron phosphate is prepared according to the process of the present invention from:

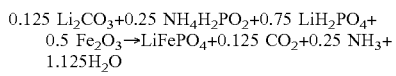
$$0.125\ Li_2CO_3 + 0.25\ NH_4H_2PO_2 + 0.75\ LiH_2PO_4 + 0.5\ Fe_2O_3 \rightarrow LiFePO_4 + 0.125\ CO_2 + 0.25\ NH_3 + 1.125\ H_2O$$

The metal-containing materials of formula $A_a M_b (X_c Y_d)_e Z_f$ prepared by the process of the present invention are suitable for use in many different applications, for example as the active material in electrodes, particularly cathodes used in energy storage devices, rechargeable batteries, electrochemical devices and electrochromic devices. This is especially the case for alkali metal (metal)-containing materials. Advantageously, the electrodes made using the materials produced by the present invention are used in conjunction with a counter electrode and one or more electrolyte materials. The electrolyte materials may be any conventional or known materials and may comprise either aqueous electrolyte(s) or non-aqueous electrolyte(s).

An inherent problem with a number of metal-containing compounds, especially alkali metal-containing compounds, is their low electrical conductivity. To address this problem it is known to add conductive materials such as carbon-containing materials for example, graphite, carbon black, sucrose and acetylene black either to the starting materials, such as during grinding, or as a coating to the final metal-containing products. Other known conductive materials include metal powders and other highly conductive inorganic materials.

It is therefore desirable, when making inherently non-conductive materials such as alkali metal-containing compounds using the solid state process of the present invention, to add/intimately disperse one or more conductive materials such as carbon to the reaction mixture and/or to one or more of the starting materials and/or to the final product.

It is believed that the $A_aM_b(X_cY_d)_eZ_f$ compounds produced by the process of the present invention may, where the starting materials so favour, be in the form of a composite material that includes a conductive compound which is preferably produced in situ during the reaction between the metal-containing precursor compounds and one or more hypophosphite-containing materials. The conductive compound formed in situ is preferably a phosphorus-containing compound, and a suitable conductive material may comprise, at least in part, a transition metal phosphide- and/or a non-transition metal phosphide- and/or a metalloid phosphide-containing material such as, in the case where the metal component M comprises iron, an iron phosphide-containing material, for example $Fe_2P$. This latter iron phosphide material in particular, is known to be highly conductive.

Thus in a second aspect, the present invention provides a composition comprising a metal-containing compound e.g. of the formula $A_aM_b(X_cY_d)_eZ_f$ as defined above, and one or more conductive materials, wherein at least a portion of the one or more conductive materials is formed in situ during the solid state process described above, in particular when one or more of the hypophosphite-containing materials is used as an agent to reduce one or more of the metal-containing precursor compounds. Desirably the invention provides a composition comprising $LiFePO_4$ and at least one conductive material comprising one or more phosphide-containing compounds. Suitable phosphide-containing compounds may include, but are not limited to binary phosphides.

Further, in a third aspect, the present invention provides a process for preparing a composition comprising a metal-containing compound, e.g. of the formula $A_aM_b(X_cY_d)_eZ_f$ defined as above, comprising forming a reaction mixture comprising i) one or more metal-containing precursor compounds and optionally one or more non-metal-containing reactants, and ii) one or more hypophosphite-containing materials; wherein one or more of the hypophosphite-containing materials is used as an agent to reduce one or more of the metal-containing precursor compounds; and further wherein the process is conducted in the absence of an oxidizing atmosphere.

In a fourth aspect, the present invention provides an electrode which utilises active materials of formula $A_aM_b(X_cY_d)_eZ_f$, prepared in accordance with the present invention as described above, especially an electrode which utilises a composition comprising such active materials in combination with a phosphorus-containing conductive material, and particularly a phosphorus-containing conductive material which has been made, at least in part, during the reaction process described above involving one or more hypophosphite-containing materials.

In a another aspect, the present invention provides a solid state method for the preparation of metal-containing compounds comprising forming a mixture of i) one or more metal-containing precursor compounds and ii) one or more materials selected from hydrosulfite-containing materials, sulfite-containing materials, formaldehyde, dimethyl amine borane (DMAB), hydrazine and borohydride-containing materials.

The hydrosulfite-containing materials may comprise, for example, sodium hydrosulfite ($Na_2S_2O_4$) (also referred to as sodium hyposulfite and sodium dithionite) or lithium hydrosulfite ($Li_2S_2O_4$), and the sulfite-containing materials may comprise, for example, sodium sulfite ($Na_2SO_3$) or lithium sulfite ($Li_2SO_3$). The latter sulfite-containing compounds are used as reducing agents, however, they advantageously may also provide a source of the sulfur and/or alkali metal component of the reaction product, for example where the reaction product is an alkali metal and/or sulfate-containing material. Thus the present invention provides a solid state process for the preparation of sulfate-containing materials comprising using one or more hydrosulfite-containing materials and/or sulfite-containing materials as a reducing agent and additionally as a source of sulfur and/or source of alkali metal. The reaction is performed in the absence of an oxidising atmosphere.

In still further aspects, the present invention provides an energy storage device comprising an electrode as described above, for use as one or more of the following: a sodium ion and/or lithium ion and/or potassium ion cell; a sodium metal and/or lithium metal and/or potassium metal ion cell; a non-aqueous electrolyte sodium ion and/or lithium ion and/or potassium ion cell; and an aqueous electrolyte sodium ion and/or lithium ion and/or potassium ion cell. Specifically, the energy storage device may be a battery.

BRIEF DESCRIPTION OF THE DRAWINGS

The present invention will now be described with reference to the following figures in which.

DETAILED DESCRIPTION

Figure 1A:
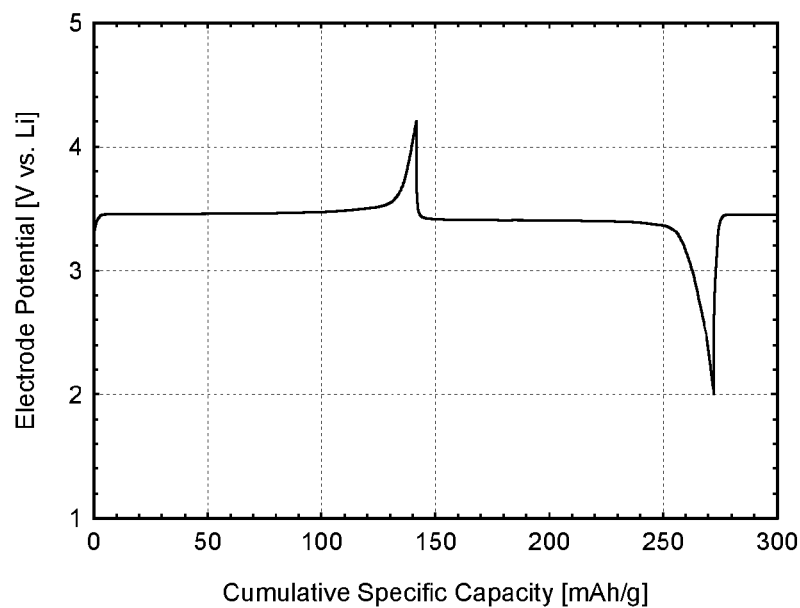
FIG. 1A shows the voltage profile (electrode potential versus cumulative specific capacity) for $LiFePO_4$ active material produced according to Example 1 of the present invention.

General Method:

1) Intimately mix together the starting materials in the correct stoichiometric ratio and press into a pellet.

2) Heat the resulting mixture in a furnace under a non-oxidizing atmosphere, at a furnace temperature of between 300° C. and 800° C. until reaction product forms.

3) Allow the product to cool before grinding it to a powder.

The starting materials and reaction conditions used in Examples 1 to 13 are summarised in Table 1 below:

TABLE 1

| EXAMPLE | STARTING MATERIALS | TARGET PRODUCT | REACTION CONDITIONS |
|---|---|---|---|
| 1 | 0.375 Li$_2$CO$_3$<br>0.75 NH$_4$H$_2$PO$_2$<br>0.25 LiH$_2$PO$_4$<br>0.5 Fe$_2$O$_3$<br>1.25 C<br>(3× amount of reducing power required, carbon in the mix) | LiFePO$_4$<br>(sample X0499, cell#205010)<br>XRD scan parameters: 2θ = 5°-60°<br>Increment: 0.05°<br>Speed: 2 secs/step | Mixing solvent: None.<br>N$_2$, 600° C., dwell time of 8 hours. |

TABLE 1-continued

| EXAMPLE | STARTING MATERIALS | TARGET PRODUCT | REACTION CONDITIONS |
|---|---|---|---|
| 2 | 0.5 $Li_2CO_3$<br>1 $NH_4H_2PO_2$<br>0.5 $Fe_2O_3$<br>(4× amount of reducing power required, no carbon in the mix) | $LiFePO_4$<br>(sample X0500, Cell #205011)<br>XRD scan parameters: $2\theta = 5°-60°$<br>Increment: 0.025°<br>Speed: 1 sec/step | Mixing solvent: None.<br>$N_2$, 600° C., dwell time of 8 hours. |
| 3 | 0.75 $H_3PO_4$<br>0.25 $H_3PO_2$<br>0.50 $Fe_2O_3$<br>1 $LiOH \cdot H_2O$<br>(No carbon in the precursor mix, no excess reducing power) | $LiFePO_4$<br>(sample X0638, Cell #207046)<br>XRD scan parameters: $2\theta = 5°-60°$<br>Increment: 0.025°<br>Speed: 1 sec/step | Mixing solvent: Water.<br>$N_2$, 400° C., dwell time of 8 hours. |
| 4 | 0.125 $Li_2CO_3$<br>0.75 $LiH_2PO_4$<br>0.5 $Fe_2O_3$<br>0.25 $NaH_2PO_2$<br>($NaH_2PO_2$, no excess reducing power, no carbon in mix) | $LiFePO_4$<br>(sample X0877, Cell # 210057)<br>XRD scan parameters: $2\theta = 5°-60°$<br>Increment: 0.025°<br>Speed: 1 sec/step | Mixing solvent: Acetone.<br>$N_2$, 600° C., dwell time of 6 hours. |
| 5 | 1 $LiH_2PO_4$<br>0.5 $Fe_2O_3$<br>0.25 $NaH_2PO_2$<br>($NaH_2PO_2$, no excess reducing power, no carbon in mix) | $LiFePO_4$<br>(sample X0879, Cell #210059)<br>XRD scan parameters: $2\theta = 5°-60°$<br>Increment: 0.025°<br>Speed: 1 sec/step | Mixing solvent: Acetone.<br>$N_2$, 600° C., dwell time of 6 hours. |
| 6 | 0.75 $LiH_2PO_4$<br>0.5 $Fe_2O_3$<br>0.25 $NaH_2PO_2$<br>(No excess reducing power, no carbon in mix) | $Li_{1-x}Na_xFePO_4$<br>(sample X0878, Cell #210058)<br>XRD scan parameters: $2\theta = 5°-60°$<br>Increment: 0.025°<br>Speed: 1 sec/step | Mixing solvent: Acetone<br>$N_2$, 600° C., dwell time of 6 hours. |
| 7 Comparative | 1 $LiH_2PO_4$<br>1 $Fe(C_2O_4) \cdot 2H_2O$ | $LiFePO_4$<br>(sample X0650, Cell # 207072)<br>XRD scan parameters: $2\theta = 5°-60°$<br>Increment: 0.025°<br>Speed: 1 sec/step | Mixing solvent: None<br>$N_2$, 750° C., dwell time of 8 hours. |
| 8 Comparative | 1 $LiH_2PO_4$<br>0.5 $Fe_2O_3$<br>1 C | $LiFePO_4$<br>(sample X0649, Cell # 207071)<br>XRD scan parameters: $2\theta = 5°-60°$<br>Increment: 0.025°<br>Speed: 1 sec/step | Mixing solvent: None<br>$N_2$, 750° C., dwell time of 8 hours. |
| 9 | 1 $Na_4H_2PO_2$<br>0.5 $Fe_2O_3$<br>(4× required amount of reducing power required, no carbon in mix) | $NaFePO_4$<br>(sample X0346 Cell # 202073)<br>XRD scan parameters: $2\theta = 5°-60°$<br>Increment: 0.015°<br>Speed: 0.5 secs/step | Mixing solvent: Water<br>$N_2$, 550° C., dwell time of 8 hours |
| 10 | 1 $Li_2CO_3$<br>1 $LiH_2PO_4$<br>1 $V_2O_5$<br>1 $NH_4H_2PO_4$<br>1 $NH_4H_2PO_2$<br>(No excess reducing power, no carbon in mix) | $Li_3V_2(PO_4)_3$<br>(sample X0491 Cell # 204079)<br>XRD scan parameters: $2\theta = 5°-60°$<br>Increment: 0.015°<br>Speed: 0.5 secs/step | Mixing solvent: None<br>$N_2$, 700° C., dwell time of 8 hours |
| 11 | 7 $NaH_2PO_4$<br>2 $NH_4H_2PO_2$<br>2 $V_2O_5$<br>(No excess reducing power, no carbon in mix) | $Na_7V_4(PO_4)(P_2O_7)_4$<br>(sample X0458 Cell # 204040)<br>XRD scan parameters: $2\theta = 5°-60°$<br>Increment: 0.015°<br>Speed: 0.5 secs/step | Mixing solvent: None<br>$N_2$, 800° C., dwell time of 8 hours |
| 12 | 1 $NaH_2PO_2$<br>1.5 $Na_2CO_3$<br>3 $FePO_4$<br>($NaH_2PO_2$ (33% excess reducing power), no carbon in mix) | $Na_4Fe_3(PO_4)_2P_2O_7$<br>(sample X0996 Cell # 212015)<br>XRD scan parameters: $2\theta = 5°-60°$<br>Increment: 0.025°<br>Speed: 1 sec/step | Mixing solvent: Acetone<br>$N_2$, 600° C., dwell time of 6 hours |

TABLE 1-continued

| EXAMPLE | STARTING MATERIALS | TARGET PRODUCT | REACTION CONDITIONS |
|---|---|---|---|
| 13 | 5.02 $NaH_2PO_4$<br>1.22 $NaH_2PO_2$<br>2.40 $Fe_2O_3$<br>1.76 $NH_4H_2PO_4$<br>($NaH_2PO_2$ (no excess reducing power), no carbon in mix) | $Na_{6.24}Fe_{4.88}(P_2O_7)_4$<br>Sample X0990<br>Cell #212008<br>XRD scan<br>parameters: 2θ = 5°-60°<br>Increment: 0.025° Speed:<br>1 sec/step | Mixing solvent:<br>Acetone<br>$N_2$, 600° C., dwell time<br>of 8 hours |

Product Analysis using XRD

Analysis by X-ray diffraction techniques was conducted using a Siemens D5000 powder diffractometer to confirm that the desired target materials had been prepared, to establish the phase purity of the product material and to determine the types of impurities present. From this information it is possible to determine the unit cell lattice parameters.

The general XRD operating conditions used to analyse the precursor electrode materials are as follows:

Slits sizes: 1 mm, 1 mm, 0.1 mm
Range: 2θ=5°-60°
X-ray Wavelength=1.5418 Å (Cu Kα)
Speed: 0.5 to 2 seconds/step
Increment: 0.015° to 0.05°

Electrochemical Results

The target materials were tested in a metallic lithium half cell which can be made using the following procedure:

Generic Procedure to Make a Lithium Metal Electrochemical Test Cell

The positive electrode is prepared by solvent-casting a slurry of the active material, conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 80% active material, 8% Super P carbon, and 12% Kynar 2801 binder. Optionally, an aluminum current collector may be used to contact the positive electrode. Metallic lithium on a copper current collector may be employed as the negative electrode. The electrolyte comprises one of the following: (i) a 1 M solution of $LiPF_6$ in ethylene carbonate (EC) and dimethyl carbonate (DMC) in a weight ratio of 1:1; (ii) a 1 M solution of $LiPF_6$ in ethylene carbonate (EC) and diethyl carbonate (DEC) in a weight ratio of 1:1; or (iii) a 1 M solution of $LiPF_6$ in propylene carbonate (PC) A glass fibre separator (Whatman, GF/A) or a porous polypropylene separator (e.g. Celgard 2400) wetted by the electrolyte is interposed between the positive and negative electrodes.

Cell Testing

The cells are tested as follows, using Constant Current Cycling techniques.

The cell is cycled at a given current density between pre-set voltage limits. A commercial battery cycler from Maccor Inc. (Tulsa, Okla., USA) is used. On charge, sodium (lithium)-ions are extracted from the cathode active material. During discharge, lithium (sodium)-ions are re-inserted into the cathode active material.

Example 1

Figure 1B:
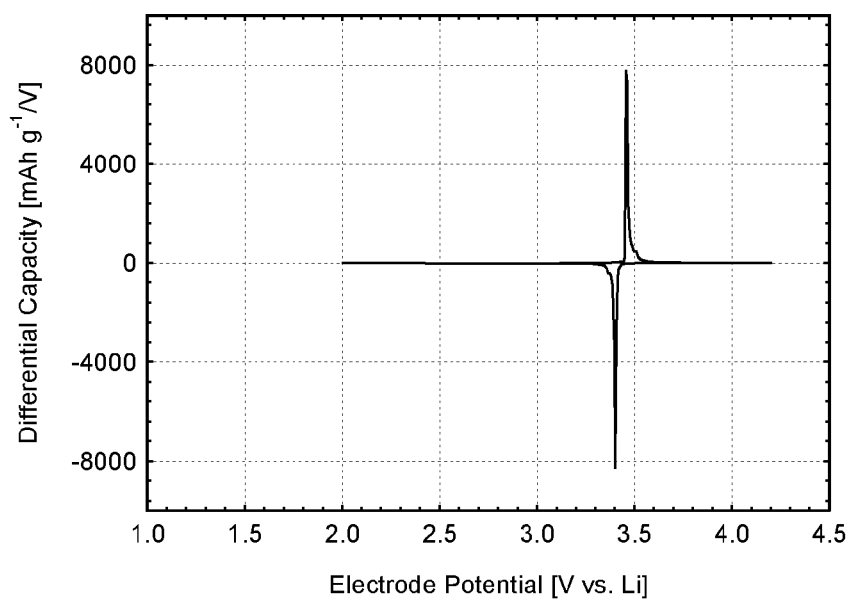
FIG. 1B shows the differential capacity profile (differential capacity versus electrode potential) for $LiFePO_4$ active material produced according to Example 1 of the present invention.
Figure 1C:
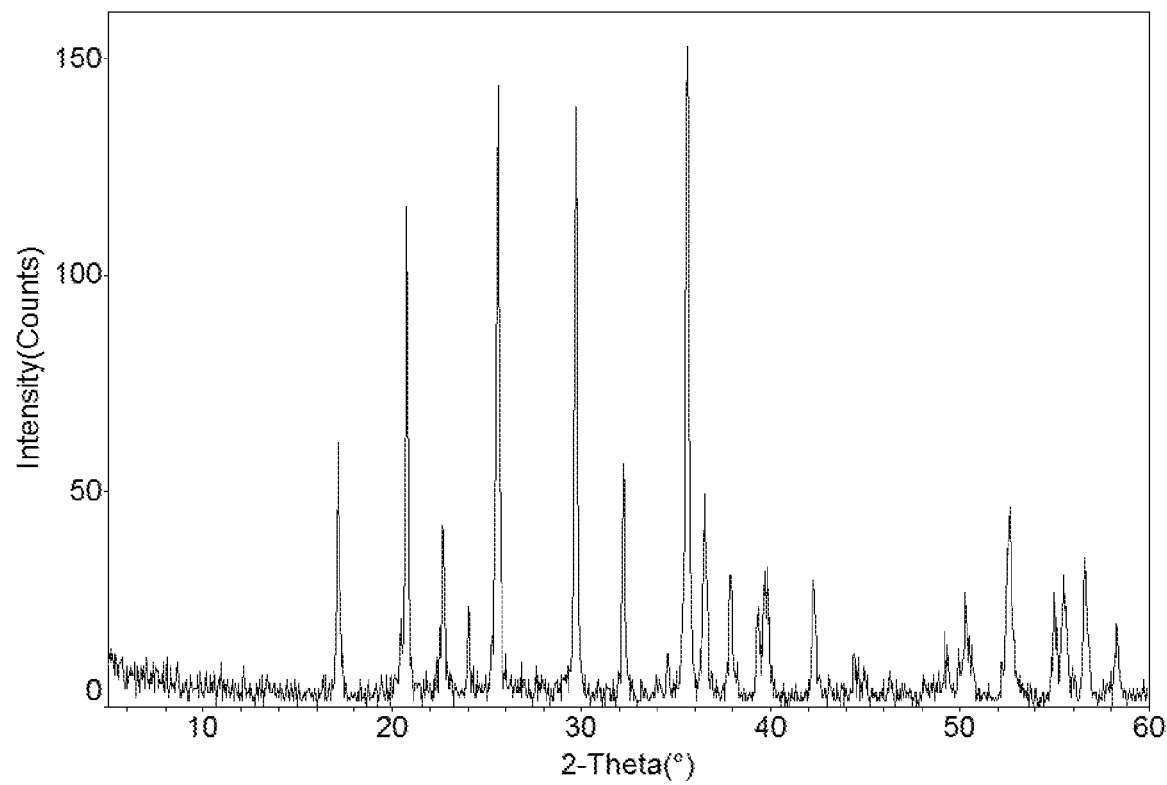
FIG. 1C is an XRD profile for $LiFePO_4$ active material produced according to Example 1 of the present invention.

FIGS. 1A and 1B (Cell#205010) show the first cycle constant current data for the $LiFePO_4$ cathode active material (X0499, made using the reducing agent, ammonium hypophosphite, $NH_4H_2PO_2$) measured in a metallic lithium half-cell. The reaction mixture also had carbon included as a conductive additive. FIG. 1A shows the voltage profile (electrode potential versus cumulative specific capacity) and FIG. 1B shows the differential capacity profile (differential capacity versus electrode potential). The constant current data shown in the figure were collected using a lithium metal counter electrode at a current density of 0.04 mA/cm² between voltage limits of 2.0 and 4.2 V. The non-aqueous electrolyte used was a 1 M solution of $LiPF_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.113 V vs. Li. Referring to FIG. 1A, during the first lithium extraction process, a charge equivalent to a material specific capacity of 142 mAh/g was obtained for the cathode active material. The subsequent re-insertion process corresponded to material specific capacity of 131 mAh/g, indicating the general reversibility of the lithium-ion insertion reactions.

The symmetrical nature of the charge-discharge voltage profile indicates the excellent reversibility of the system. This is further exemplified by the symmetrical nature of the differential capacity profile shown in FIG. 1B.

Example 2

Figure 2A:
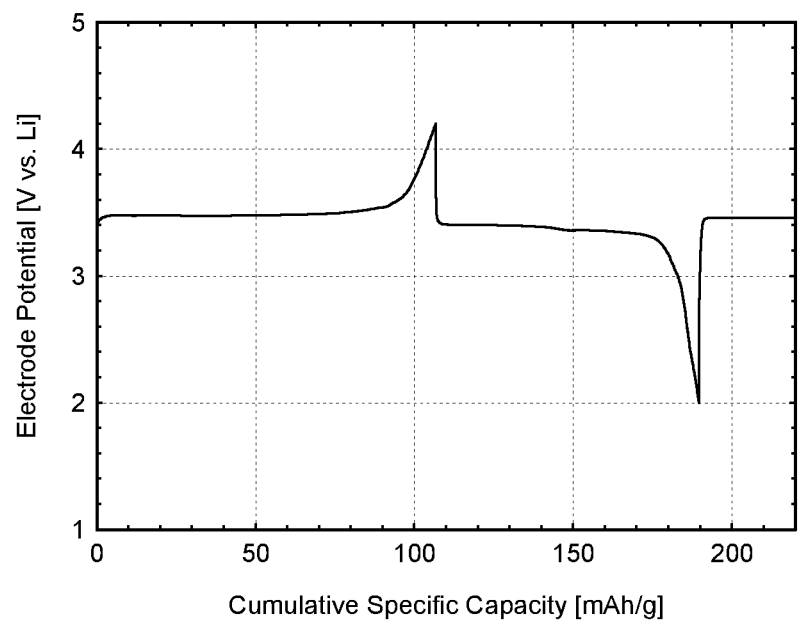
FIG. 2A shows the voltage profile (electrode potential versus cumulative specific capacity) for $LiFePO_4$ active material produced according to Example 2 of the present invention.
Figure 2B:
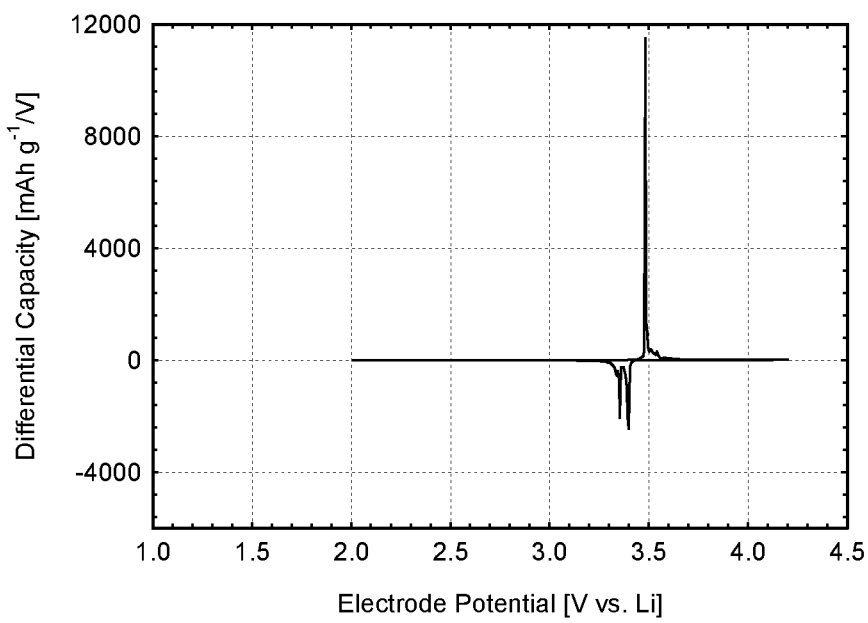
FIG. 2B shows the differential capacity profile (differential capacity versus electrode potential) for $LiFePO_4$ active material produced according to Example 2 of the present invention.
Figure 2C:
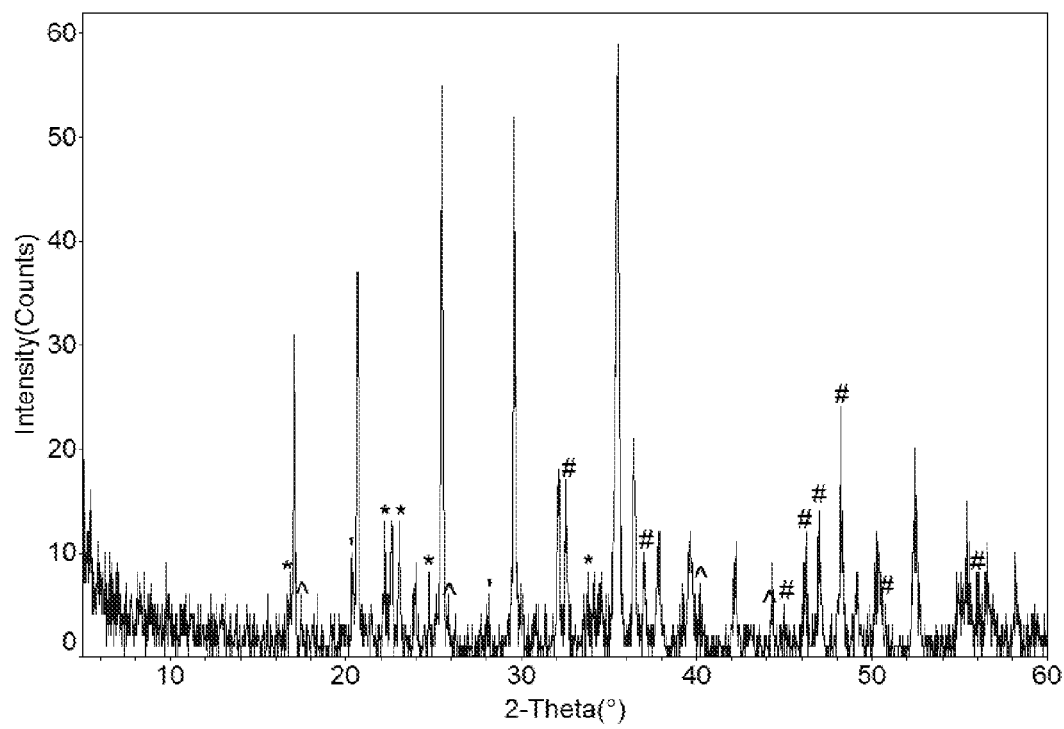
FIG. 2C is an XRD profile for $LiFePO_4$ active material produced according to Example 2 of the present invention with impurities labeled as follows: *$Li_3PO_4$, #FeP, '$Li_4P_2O_7$, and ^$Fe_2P$.

FIGS. 2A and 2B (Cell#205011) show the first cycle constant current data for the $LiFePO_4$ cathode active material (X0500, made using the reducing agent, ammonium hypophosphite, $NH_4H_2PO_2$) measured in a metallic lithium half-cell. FIG. 2A shows the voltage profile (electrode potential versus cumulative specific capacity) and FIG. 2B shows the differential capacity profile (differential capacity versus electrode potential). The constant current data shown in the figure were collected using a lithium metal counter electrode at a current density of 0.04 mA/cm² between voltage limits of 2.0 and 4.2 V. The non-aqueous electrolyte used was a 1 M solution of $LiPF_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.029 V vs. Li. Referring to FIG. 2A, during the first lithium extraction process, a charge equivalent to a material specific capacity of 107 mAh/g was obtained for the cathode active material. The subsequent re-insertion process corresponded to material specific capacity of 83 mAh/g, indicating the general reversibility of the lithium-ion insertion reactions.

The symmetrical nature of the charge-discharge voltage profile indicates the reversibility of the system. This is further exemplified by the symmetrical nature of the differential capacity profile shown in FIG. 2B.

Example 3

Figure 3A:
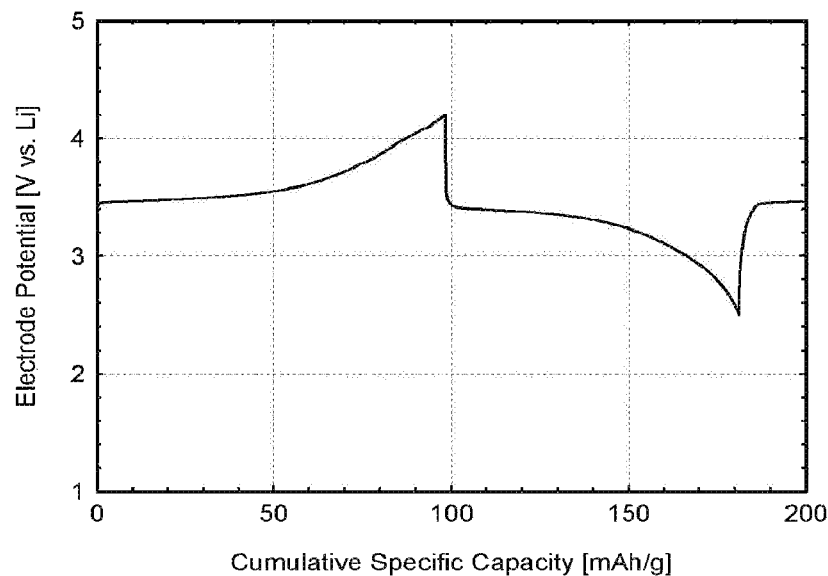
FIG. 3A shows the voltage profile (electrode potential versus cumulative specific capacity) for $LiFePO_4$ active material produced according to Example 3 of the present invention.
Figure 3B:
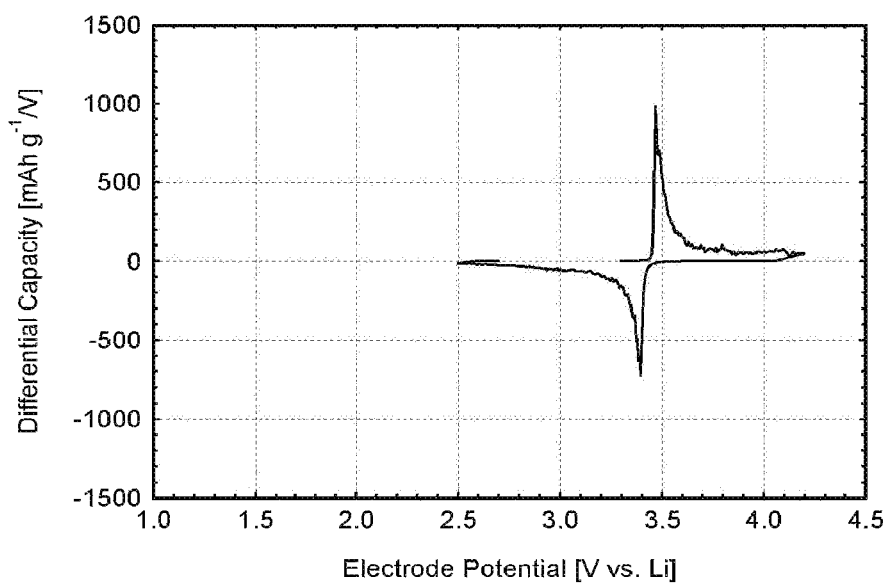
FIG. 3B shows the differential capacity profile (differential capacity versus electrode potential) for $LiFePO_4$ active material produced according to Example 3 of the present invention.
Figure 3C:
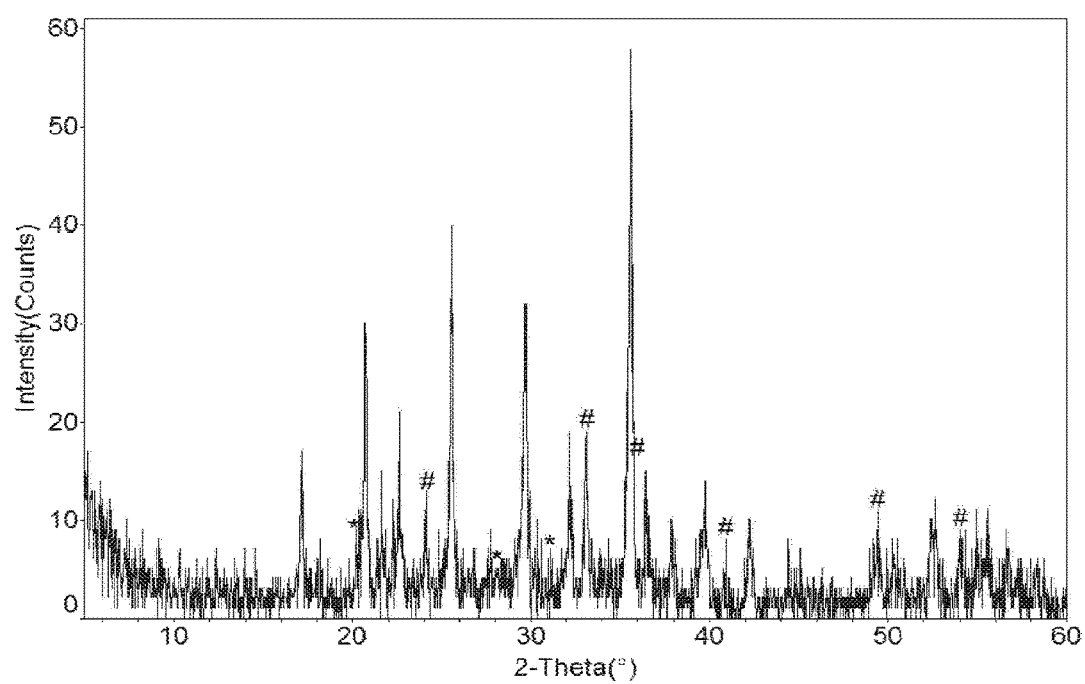
FIG. 3C is an XRD profile for LiFePO$_4$ active material produced according to Example 3 of the present invention, with impurities labeled as follows: * Li$_4$P$_2$O$_7$, # Fe$_2$O$_3$.

FIGS. 3A and 3B (Cell#207046) show the first cycle constant current data for the $LiFePO_4$ cathode active material (X0638, made using the reducing agent, hypophosphorous acid $H_3PO_2$) measured in a metallic lithium half-cell. FIG. 3A shows the voltage profile (electrode potential versus cumulative specific capacity) and FIG. 3B shows the differential capacity profile (differential capacity versus electrode potential). The constant current data shown in the figure were collected using a lithium metal counter electrode at a current density of 0.04 $mA/cm^2$ between voltage limits of 2.5 and 4.2 V. The non-aqueous electrolyte used was a 1 M solution of $LiPF_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.287 V vs. Li. Referring to FIG. 3A, during the first lithium extraction process, a charge equivalent to a material specific capacity of 98 mAh/g was obtained for the cathode active material. The subsequent re-insertion process corresponded to material specific capacity of 84 mAh/g, indicating the general reversibility of the lithium-ion insertion reactions.

The symmetrical nature of the charge-discharge voltage profile indicates the reversibility of the system. This is further exemplified by the symmetrical nature of the differential capacity profile shown in FIG. 3B.

Example 4

Figure 4A:
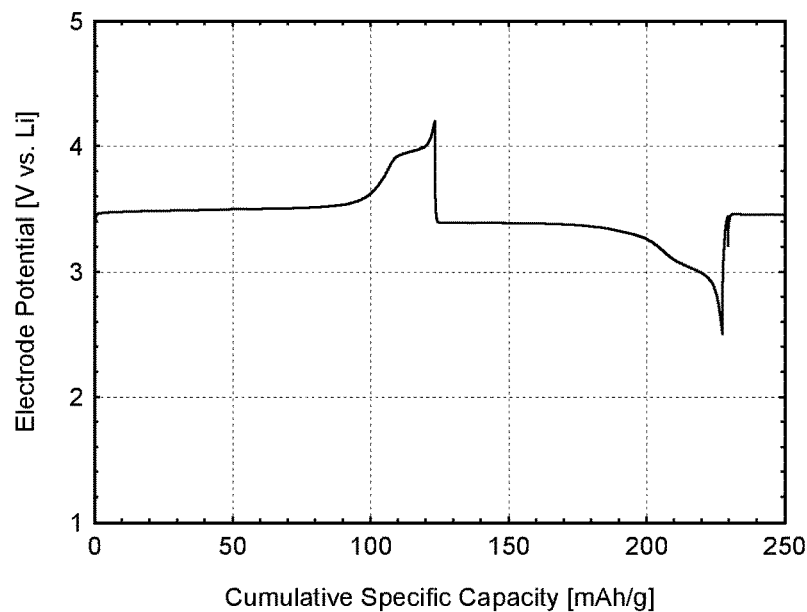
FIG. 4A shows the voltage profile (electrode potential versus cumulative specific capacity) for LiFePO$_4$ active material produced according to comparative Example 4.
Figure 4B:
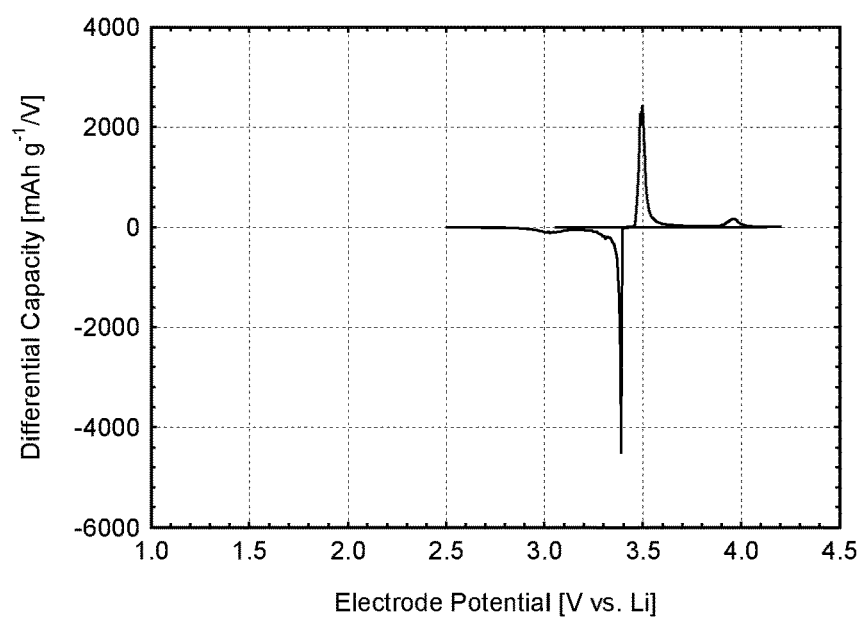
FIG. 4B shows the differential capacity profile (differential capacity versus electrode potential) for LiFePO$_4$ active material produced according to comparative Example 4.
Figure 4C:
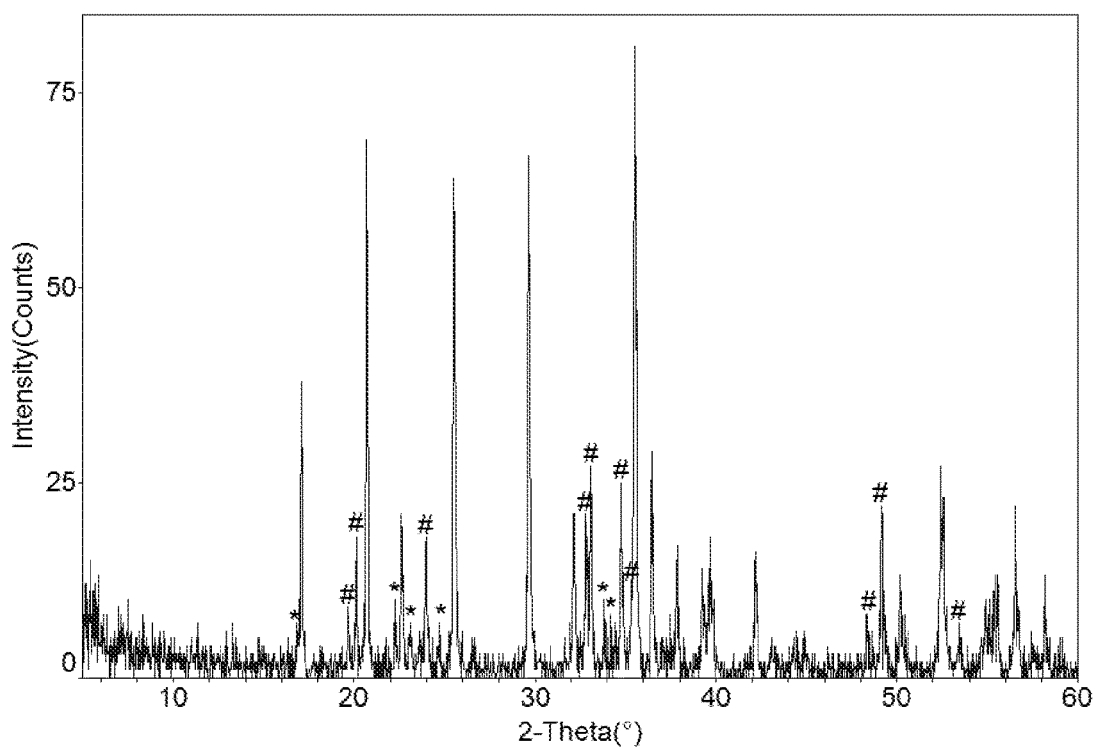
FIG. 4C is an XRD profile for LiFePO$_4$ active material produced according to comparative Example 4, with impurities labeled as follows: *Li$_3$PO$_4$, #NaFePO$_4$.

FIGS. 4A and 4B (Cell#210057) show the first cycle constant current data for the $LiFePO_4$ cathode active material (X0877, made using the reducing agent, sodium hypophosphite, $NaH_2PO_2$ and assuming a $Na_2O$ by-product) measured in a metallic lithium half-cell. FIG. 4A shows the voltage profile (electrode potential versus cumulative specific capacity) and FIG. 4B shows the differential capacity profile (differential capacity versus electrode potential). The constant current data shown in the figure were collected using a lithium metal counter electrode at a current density of 0.04 $mA/cm^2$ between voltage limits of 2.5 and 4.2 V. The non-aqueous electrolyte used was a 1 M solution of $LiPF_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.038 V vs. Li. Referring to FIG. 4A, during the first lithium extraction process, a charge equivalent to a material specific capacity of 123 mAh/g was obtained for the cathode active material. The subsequent re-insertion process corresponded to material specific capacity of 104 mAh/g, indicating the general reversibility of the lithium-ion insertion reactions.

The symmetrical nature of the charge-discharge voltage profile indicates the reversibility of the system. This is further exemplified by the symmetrical nature of the differential capacity profile shown in FIG. 4B.

Example 5

Figure 5A:
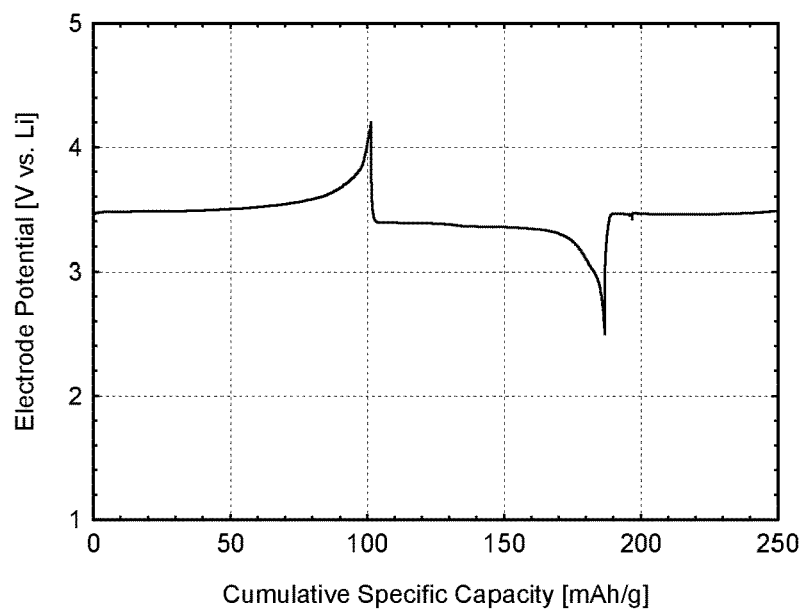
FIG. 5A shows the voltage profile (electrode potential versus cumulative specific capacity) for LiFePO$_4$ active material produced according to Example 5.
Figure 5B:
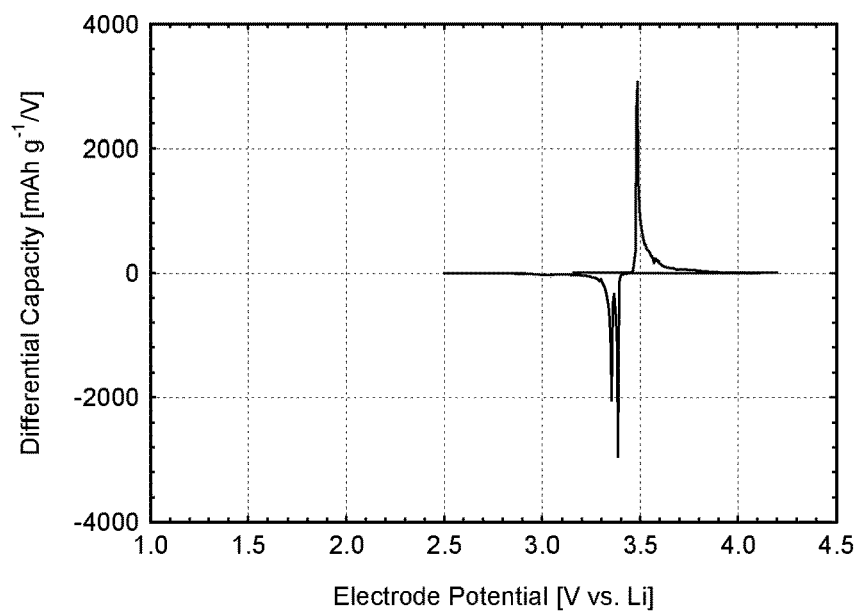
FIG. 5B shows the differential capacity profile (differential capacity versus electrode potential) for LiFePO$_4$ active material produced according to comparative Example 5.
Figure 5C:
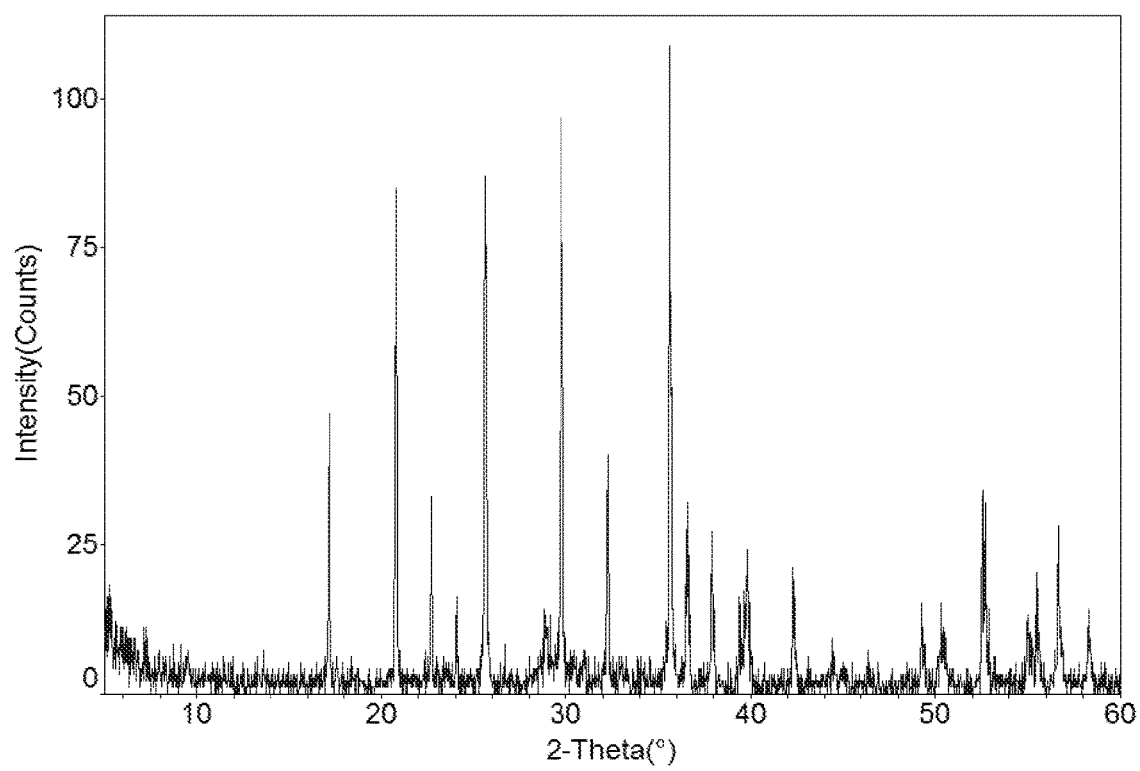
FIG. 5C is an XRD profile for LiFePO$_4$ active material produced according to comparative Example 5.

FIGS. 5A and 5B (Cell#210059) show the first cycle constant current data for the $LiFePO_4$ cathode active material (X0879, made using the reducing agent, sodium hypophosphite, $NaH_2PO_2$ and assuming a $NaPO_3$ by-product) measured in a metallic lithium half-cell. FIG. 5A shows the voltage profile (electrode potential versus cumulative specific capacity) and FIG. 5B shows the differential capacity profile (differential capacity versus electrode potential). The constant current data shown in the figure were collected using a lithium metal counter electrode at a current density of 0.04 $mA/cm^2$ between voltage limits of 2.5 and 4.2 V. The non-aqueous electrolyte used was a 1 M solution of $LiPF_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.145 V vs. Li. Referring to FIG. 5A, during the first lithium extraction process, a charge equivalent to a material specific capacity of 102 mAh/g was obtained for the cathode active material. The subsequent re-insertion process corresponded to material specific capacity of 85 mAh/g, indicating the general reversibility of the lithium-ion insertion reactions.

The symmetrical nature of the charge-discharge voltage profile indicates the reversibility of the system. This is further exemplified by the symmetrical nature of the differential capacity profile shown in FIG. 5B.

Example 6

Figure 6A:
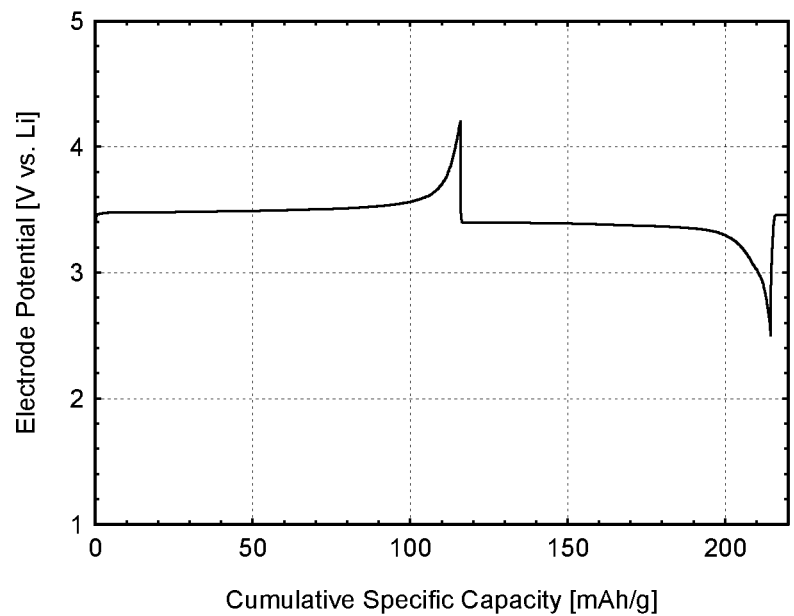
FIG. 6A shows the voltage profile (electrode potential versus cumulative specific capacity) for Li$_{1-x}$Na$_x$FePO$_4$ active material produced according to Example 6 of the present invention.
Figure 6B:
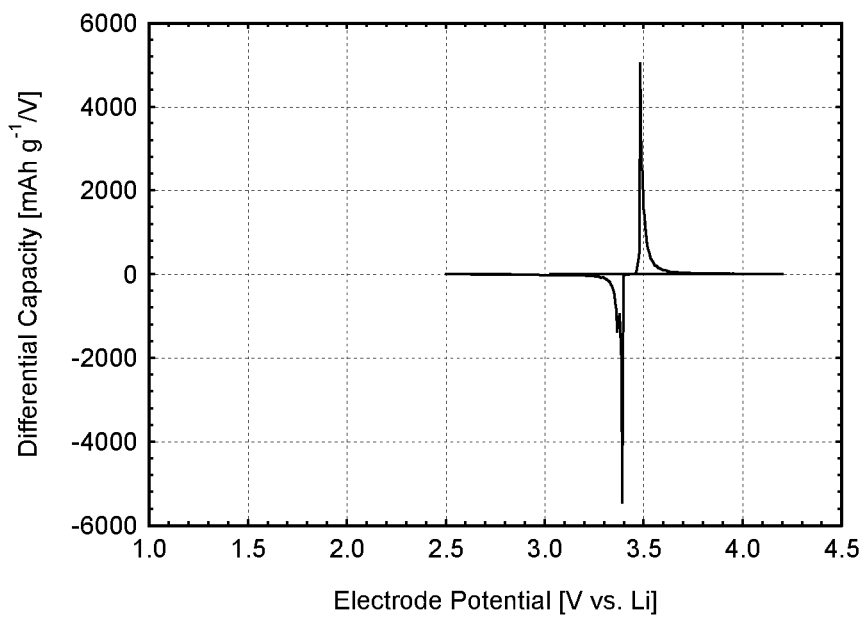
FIG. 6B shows the differential capacity profile (differential capacity versus electrode potential) for Li$_{1-x}$Na$_x$FePO$_4$ active material produced according to Example 6 of the present invention.
Figure 6C:
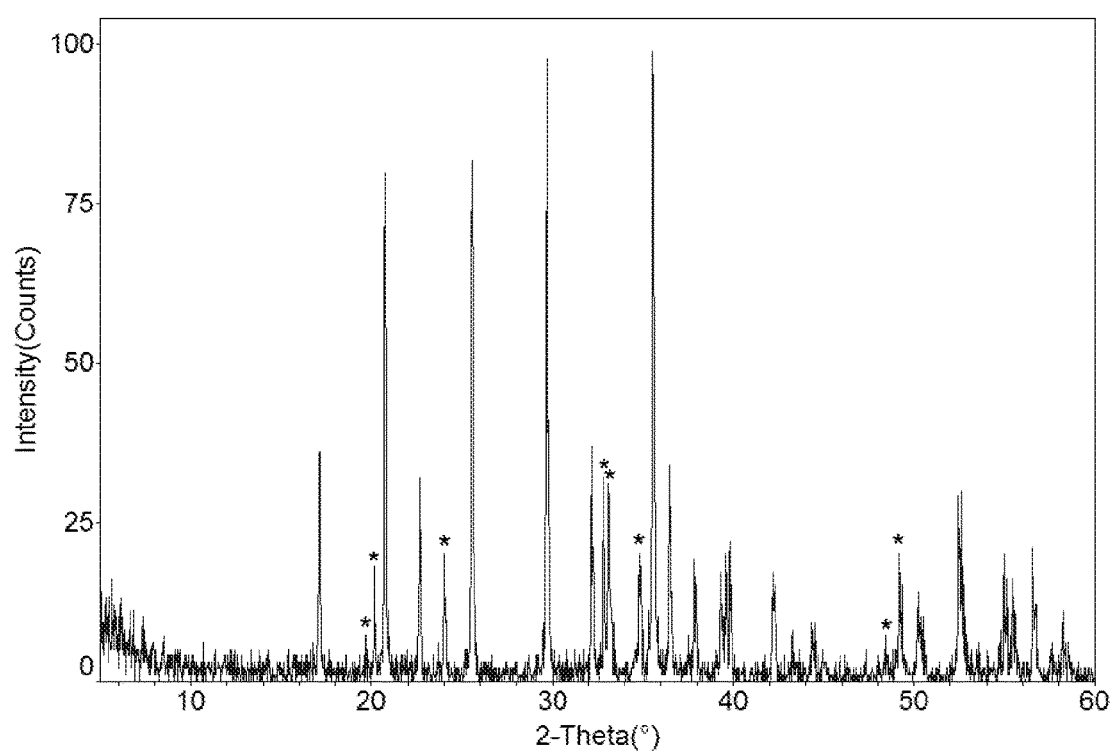
FIG. 6C is an XRD profile for Li$_{1-x}$Na$_x$FePO$_4$ active material produced according to Example 6 of the present invention, with impurities labeled as follows: *NaFePO$_4$.

FIGS. 6A and 6B (Cell#210058) show the first cycle constant current data for the $Li_{1-x}Na_xFePO_4$ cathode active material (X0878, made using the reducing agent, sodium hypophosphite, $NaH_2PO_2$) measured in a metallic lithium half-cell. FIG. 6A shows the voltage profile (electrode potential versus cumulative specific capacity) and FIG. 6B shows the differential capacity profile (differential capacity versus electrode potential).

The constant current data shown in the figure were collected using a lithium metal counter electrode at a current density of 0.04 $mA/cm^2$ between voltage limits of 2.5 and 4.2 V. The non-aqueous electrolyte used was a 1 M solution of $LiPF_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.012 V vs. Li. Referring to FIG. 6A, during the first lithium extraction process, a charge equivalent to a material specific capacity of 117 mAh/g was obtained for the cathode active material. The subsequent re-insertion process corresponded to material specific capacity of 100 mAh/g, indicating the general reversibility of the lithium-ion insertion reactions.

The symmetrical nature of the charge-discharge voltage profile indicates the reversibility of the system. This is further exemplified by the symmetrical nature of the differential capacity profile shown in FIG. 6B.

Example 7 (Comparative)

Figure 7A:
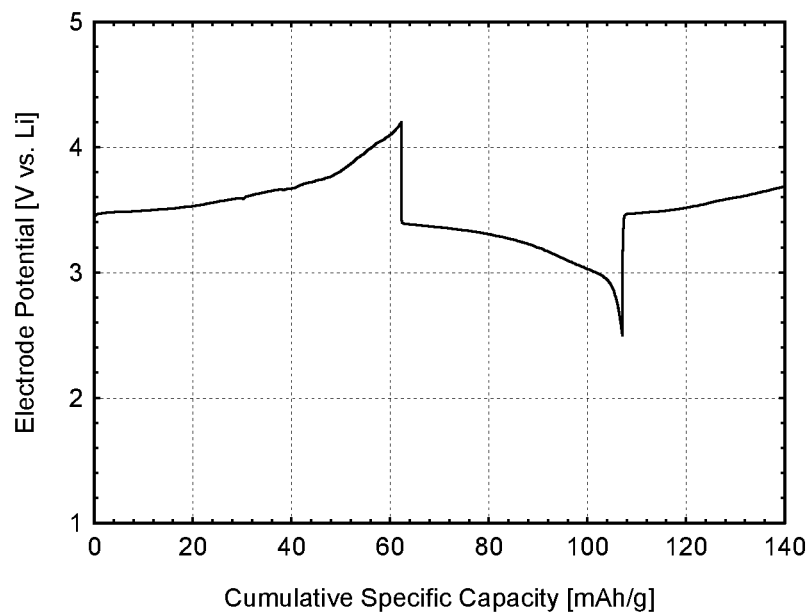
FIG. 7A shows the voltage profile (electrode potential versus cumulative specific capacity) for LiFePO$_4$ active material produced according to Example 7 (comparative)
Figure 7B:
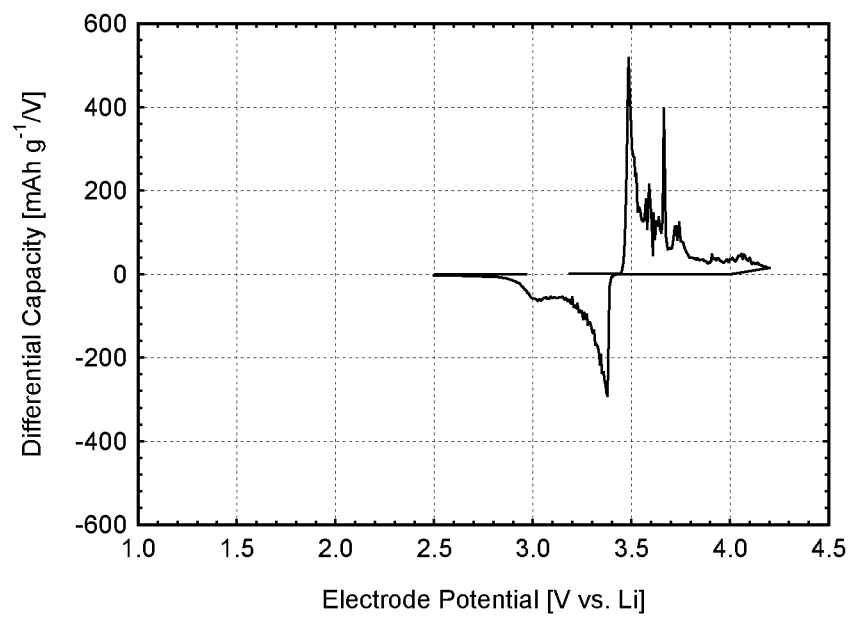
FIG. 7B shows the differential capacity profile (differential capacity versus electrode potential) for LiFePO$_4$ active material produced according to Example 7 (comparative)
Figure 7C:
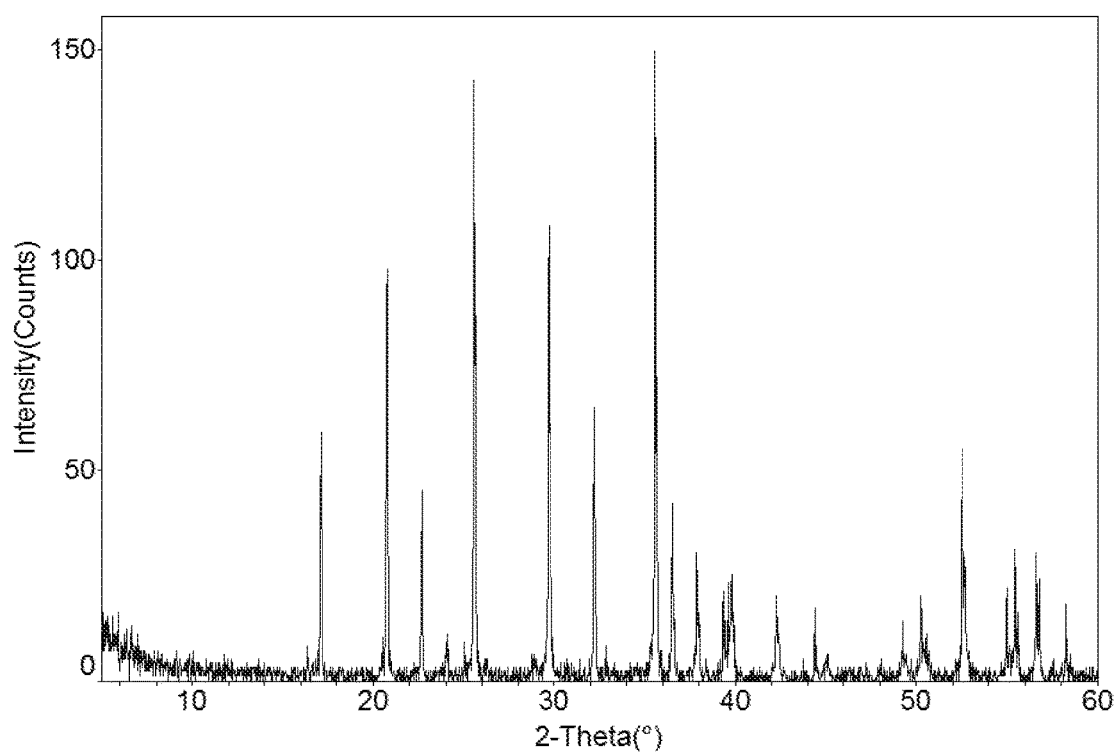
FIG. 7C is an XRD profile for LiFePO$_4$ active material produced according to Example 7 (comparative)

FIGS. 7A and 7B (Cell#207072) show the first cycle constant current data for the $LiFePO_4$ cathode active material (X0650, made from iron oxalate, $Fe(C_2O_4) \cdot 2H_2O$— an $Fe^{2+}$ precursor that requires no reducing agent) measured in a metallic lithium half-cell. FIG. 7A shows the voltage profile (electrode potential versus cumulative specific capacity) and FIG. 7B shows the differential capacity profile (differential capacity versus electrode potential). The constant current data shown in the figure were collected using a lithium metal counter electrode at a current density of 0.04 $mA/cm^2$ between voltage limits of 2.5 and 4.2 V. The non-aqueous electrolyte used was a 1 M solution of $LiPF_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.177 V vs. Li. Referring to FIG. 7A, during the first lithium extraction process, a charge equivalent to a material specific capacity of 63 mAh/g was obtained for the cathode active material. This is a relatively low material utilization. The subsequent re-insertion process corresponded to material specific capacity of 45 mAh/g indicating the relatively poor reversibility. FIG. 7B shows the corresponding differential capacity profile for this material which is indistinct and noisy indicating the poor electrochemical reversibility of the active material.

Example 8 (Comparative)

Figure 8A:
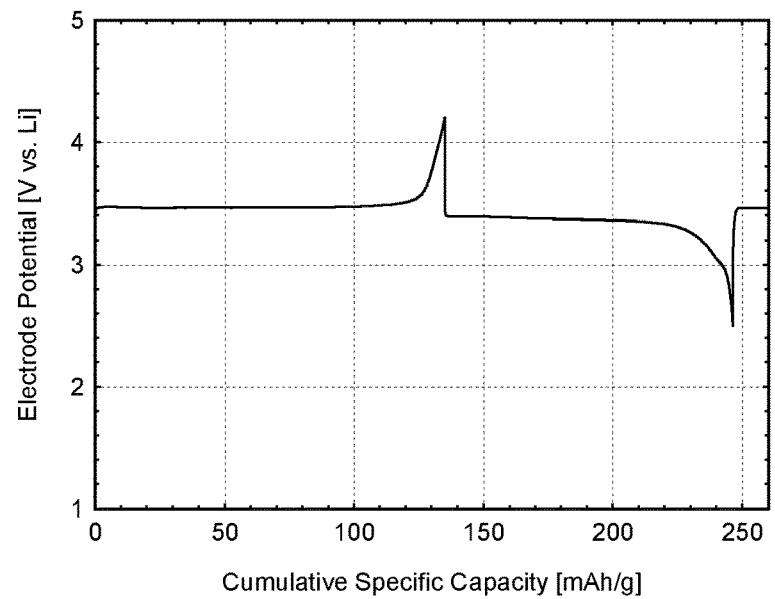
FIG. 8A shows the voltage profile (electrode potential versus cumulative specific capacity) for LiFePO$_4$ active material produced according to Example 8 (comparative)
Figure 8B:
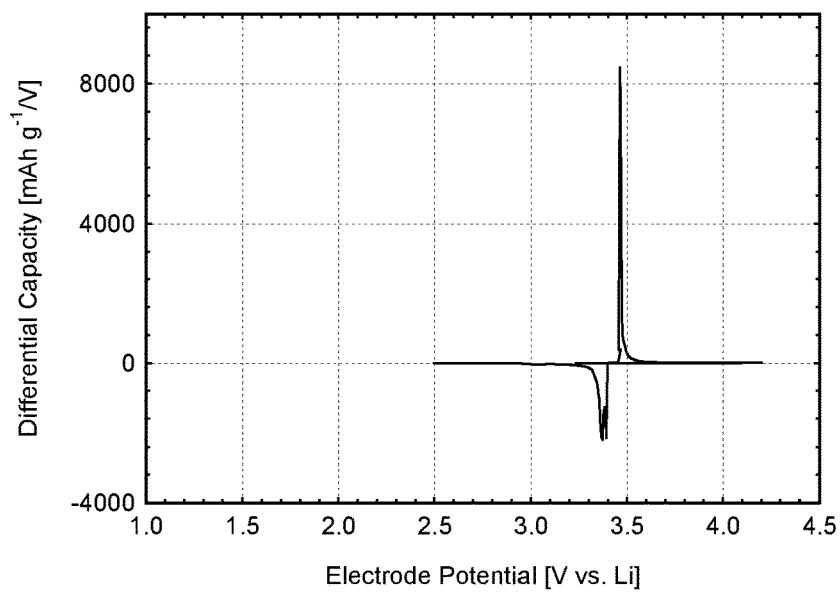
FIG. 8B shows the differential capacity profile (differential capacity versus electrode potential) for LiFePO$_4$ active material produced according to Example 8 (comparative)
Figure 8C:
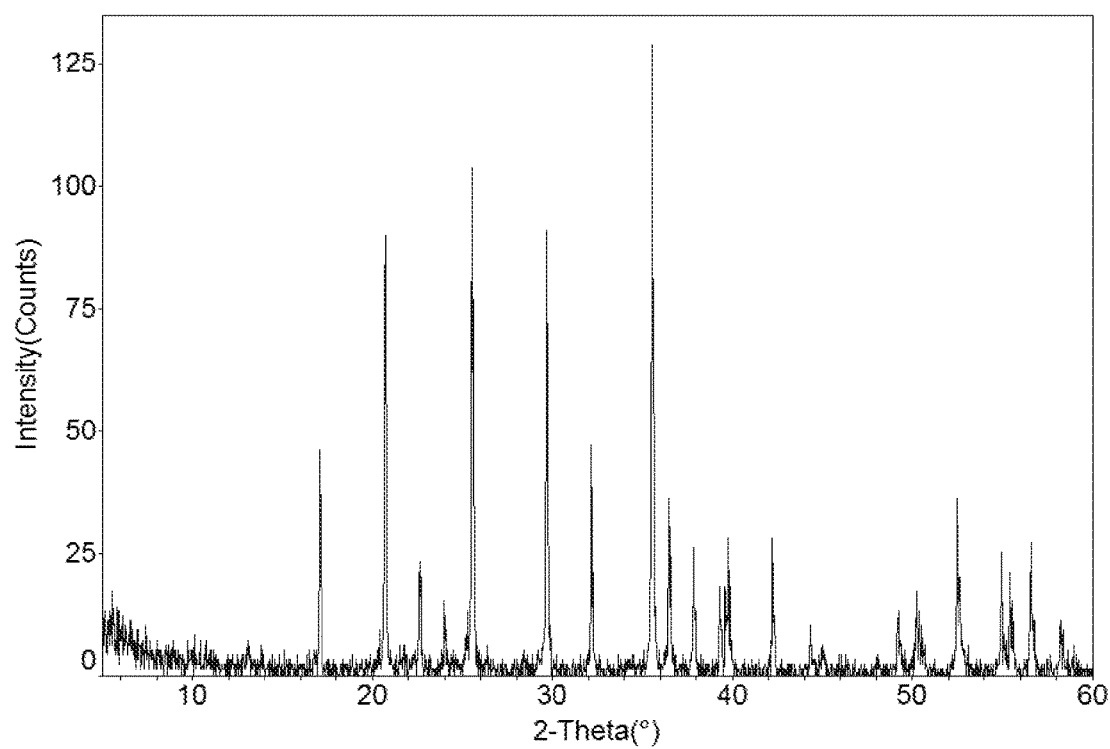
FIG. 8C is an XRD profile for LiFePO$_4$ active material produced according to Example 8 (comparative)

FIGS. 8A and 8B (Cell#207071) show the first cycle constant current data for the $LiFePO_4$ cathode active material (X0649, made from $Fe_2O_3$ by carbothermal reduction using Super P Carbon (Timcal) as the reducing agent and conductivity enhancer) measured in a metallic lithium half-cell. FIG. 8A shows the voltage profile (electrode potential versus cumulative specific capacity) and FIG. 8B shows the differential capacity profile (differential capacity versus electrode potential). The constant current data shown in the figure were collected using a lithium metal counter electrode at a current density of 0.04 mA/cm$^2$ between voltage limits of 2.5 and 4.2 V. The non-aqueous electrolyte used was a 1 M solution of $LiPF_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.177 V vs. Li. Referring to FIG. 8A, during the first lithium extraction process, a charge equivalent to a material specific capacity of 135 mAh/g was obtained for the cathode active material. The subsequent re-insertion process corresponded to material specific capacity of 111 mAh/g indicating good reversibility.

The symmetrical nature of the charge-discharge voltage profile further indicates the reversibility of the system. This is further exemplified by the symmetrical nature of the differential capacity profile shown in FIG. 8B.

Example 9

Figure 9A:
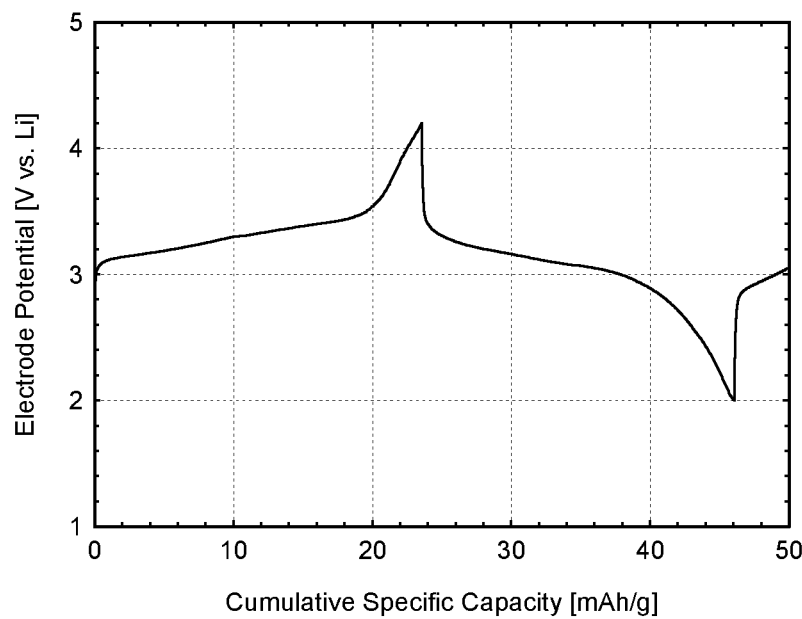
FIG. 9A shows the voltage profile (electrode potential versus cumulative specific capacity) for NaFePO$_4$ active material produced according to Example 9 of the present invention.
Figure 9B:
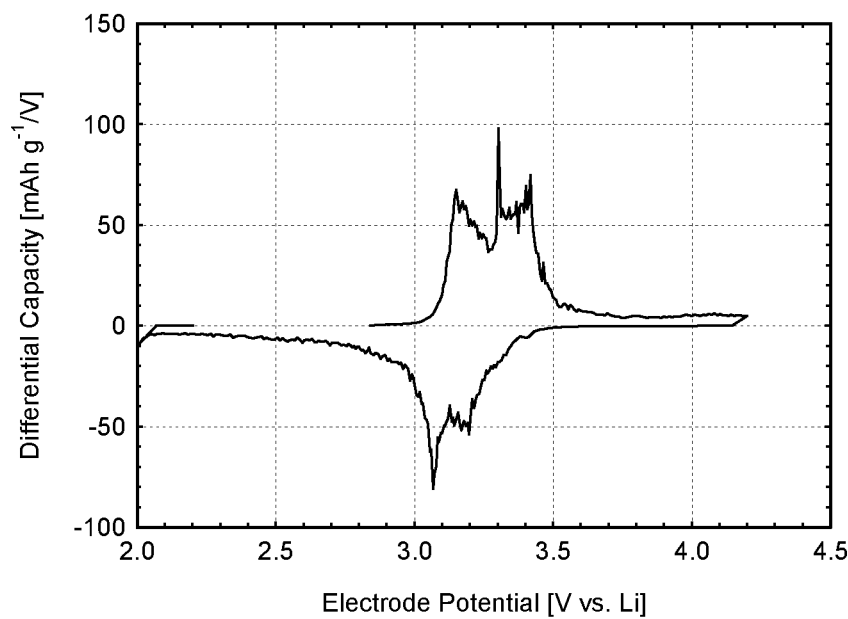
FIG. 9B shows the differential capacity profile (differential capacity versus electrode potential) for NaFePO$_4$ active material produced according to Example 9 of the present invention.
Figure 9C:
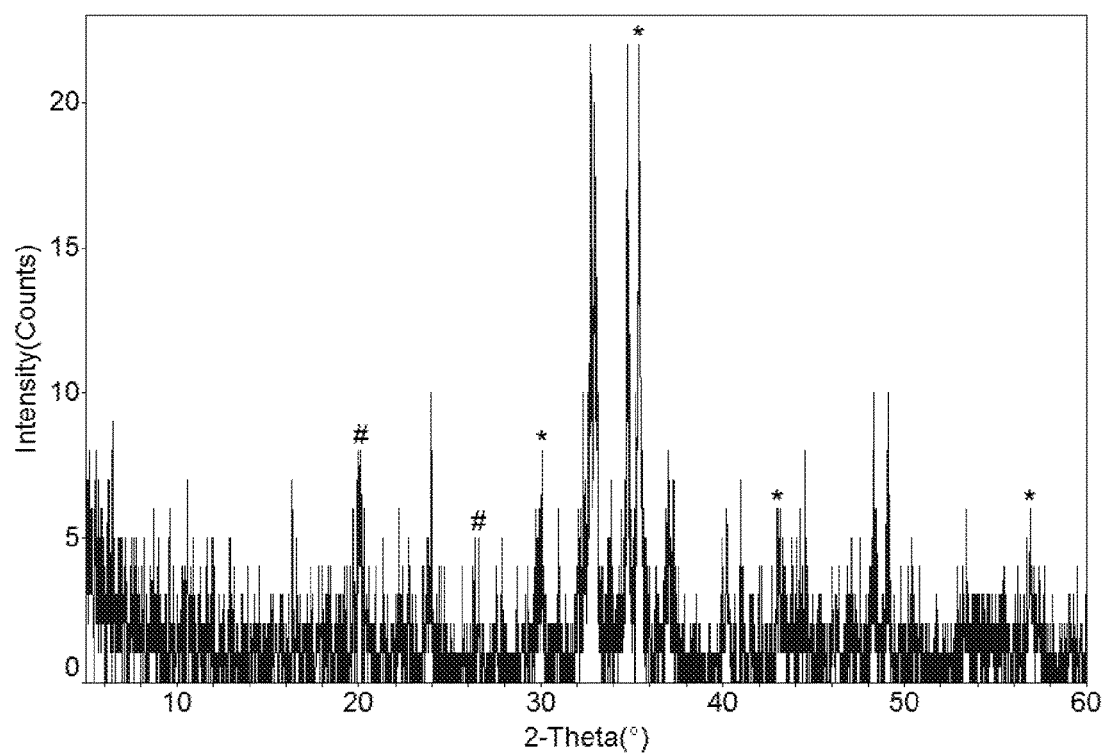
FIG. 9C is an XRD profile for NaFePO$_4$ active material produced according to Example 9 of the present invention, with impurities labeled as follows: *Fe$_3$O$_4$, #Na$_4$P$_2$O$_7$.

FIGS. 9A and 9B (Cell#202073) show the first cycle constant current data for the $NaFePO_4$ cathode active material (X0346B, made using the reducing agent, sodium hypophosphite, $NaH_2PO_2$) measured in a metallic lithium half-cell. FIG. 9A shows the voltage profile (electrode potential versus cumulative specific capacity) and FIG. 9B shows the differential capacity profile (differential capacity versus electrode potential). The constant current data shown in the figure were collected using a lithium metal counter electrode at a current density of 0.04 mA/cm$^2$ between voltage limits of 2.0 and 4.2 V. The non-aqueous electrolyte used was a 1 M solution of $LiPF_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 2.804 V vs. Li. Referring to FIG. 9A, it is assumed that sodium ions are extracted from the active material during the initial charging of the cell. During the sodium ion extraction process, a charge equivalent to a material specific capacity of 24 mAh/g was obtained for the cathode active material. It is expected from thermodynamic considerations that the sodium extracted from the $NaFePO_4$ material during the initial charging process, enters the electrolyte, and is then displacement 'plated' onto the lithium metal anode (i.e. releasing more lithium into the electrolyte). Therefore, during the subsequent discharging of the cell, it is assumed that a mix of lithium and sodium is re-inserted into the material. The re-insertion process corresponds to 23 mAh/g, indicating the reversibility of the ion insertion reactions.

The symmetrical nature of the charge-discharge voltage profile indicates the reversibility of the system. This is further exemplified by the symmetrical nature of the differential capacity profile shown in FIG. 9B.

Example 10

Figure 10A:
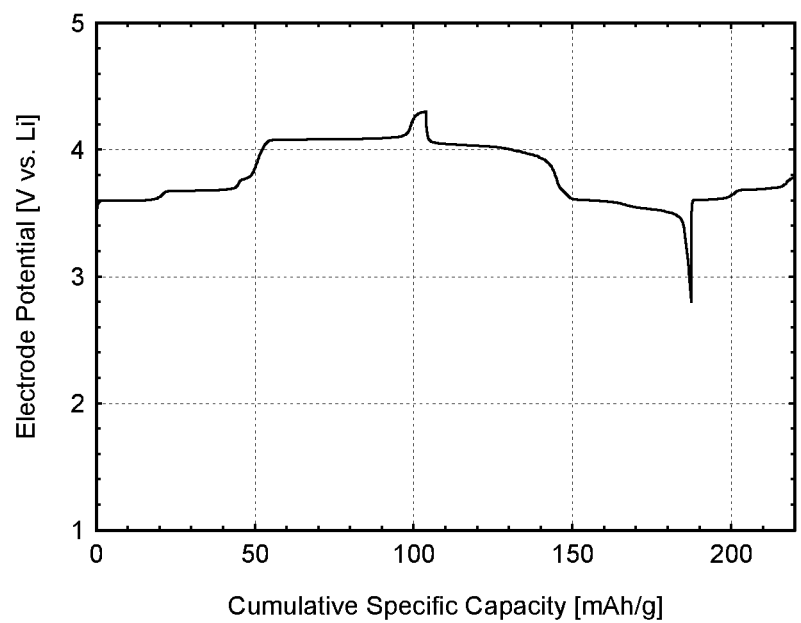
FIG. 10A shows the voltage profile (electrode potential versus cumulative specific capacity) for Li$_3$V$_2$(PO$_4$)$_3$ active material produced according to Example 10 of the present invention.
Figure 10B:
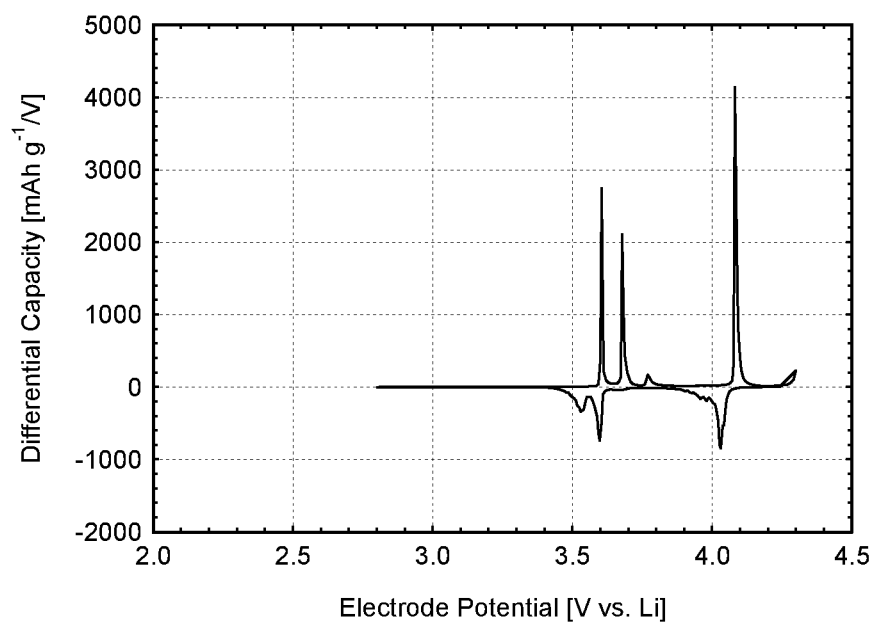
FIG. 10B shows the differential capacity profile (differential capacity versus electrode potential) for Li$_3$V$_2$(PO$_4$)$_3$ active material produced according to Example 10 of the present invention.
Figure 10C:
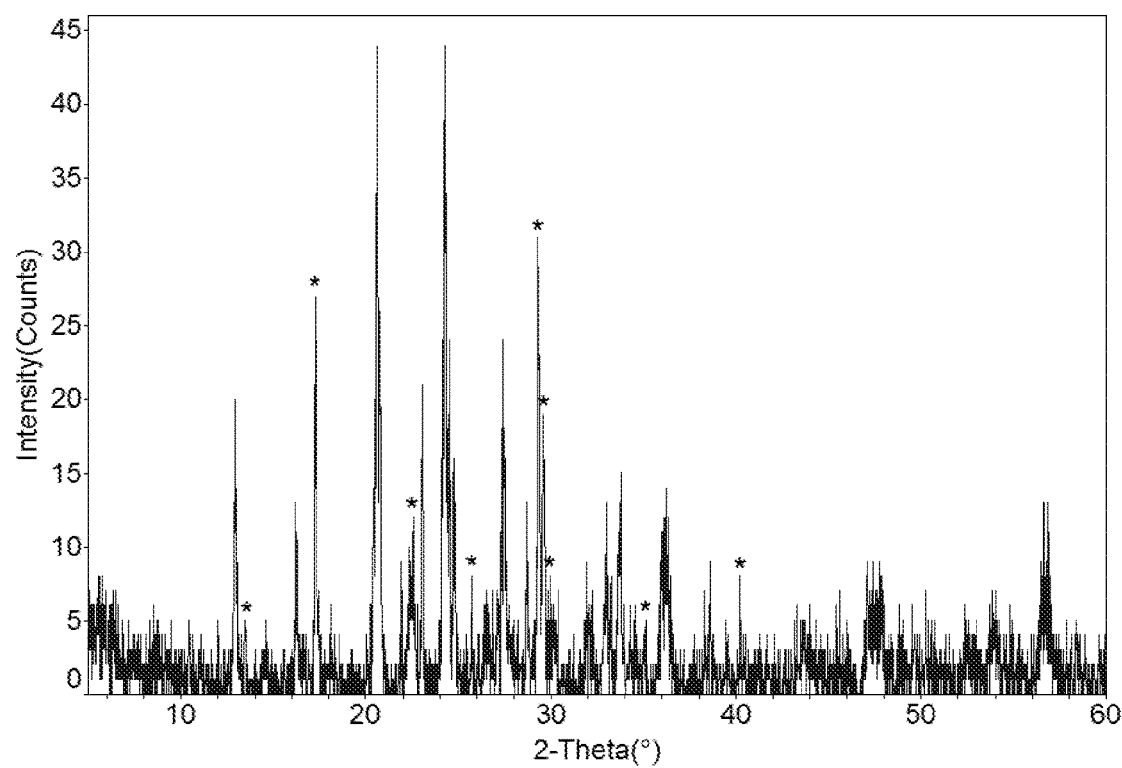
FIG. 10C is an XRD profile for Li$_3$V$_2$(PO$_4$)$_3$ active material produced according to Example 10 of the present invention (asterisks denote peaks due to LiVP$_2$O$_7$ impurity)

FIGS. 10A and 10B (Cell#204079) show the first cycle constant current data for the $Li_3V_2(PO_4)_3$ cathode active material (X0491, made using the reducing agent, ammoinium hypophosphite, $NH4H_2PO_2$) measured in a metallic lithium half-cell. FIG. 10A shows the voltage profile (electrode potential versus cumulative specific capacity) and FIG. 10B shows the differential capacity profile (differential capacity versus electrode potential). The constant current data shown in the figure were collected using a lithium metal counter electrode at a current density of 0.04 mA/cm$^2$ between voltage limits of 2.8 and 4.3 V. The non-aqueous electrolyte used was a 1 M solution of $LiPF_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 3.054 V vs. Li. Referring to FIG. 10A, during the first lithium extraction process, a charge equivalent to a material specific capacity of 103 mAh/g was obtained for the cathode active material. The subsequent re-insertion process corresponded to material specific capacity of 83 mAh/g, indicating the general reversibility of the lithium-ion insertion reactions.

The symmetrical nature of the charge-discharge voltage profile indicates the reversibility of the system. This is further exemplified by the symmetrical nature of the differential capacity profile shown in FIG. 10B.

Example 11

Figure 11A:
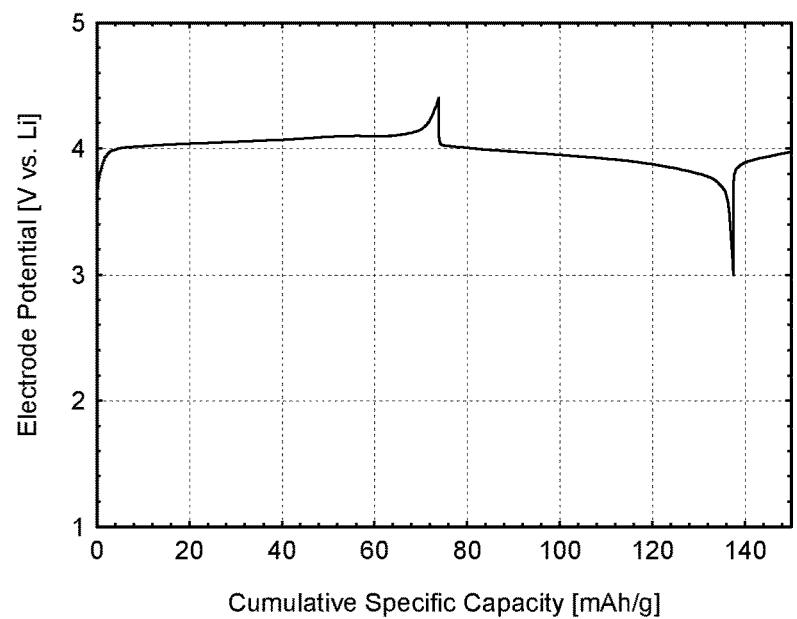
FIG. 11A shows the voltage profile (electrode potential versus cumulative specific capacity) for Na$_7$V$_4$(PO$_4$)(P$_2$O$_7$)$_4$ active material produced according to Example 11 of the present invention.
Figure 11B:
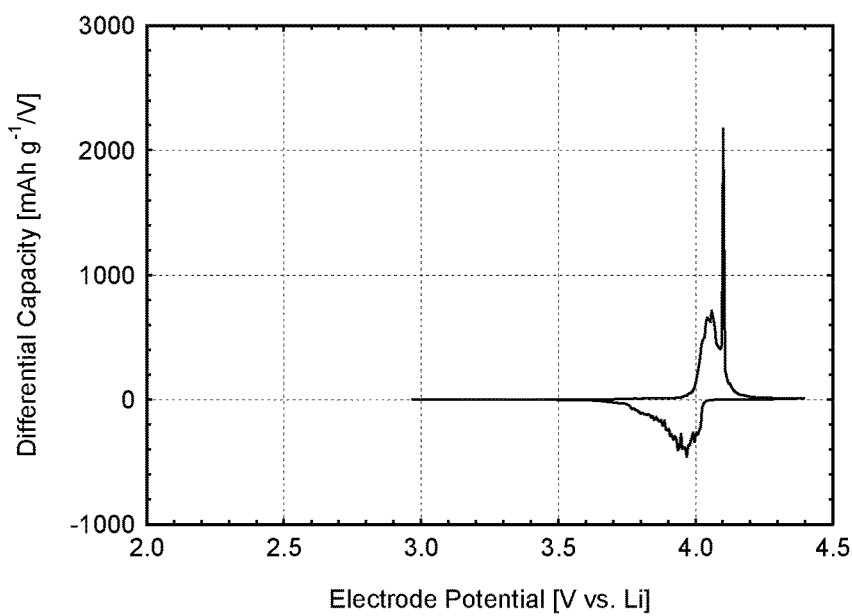
FIG. 11B shows the differential capacity profile (differential capacity versus electrode potential) for Na$_7$V$_4$(PO$_4$)(P$_2$O$_7$)$_4$ active material produced according to Example 11 of the present invention.
Figure 11C:
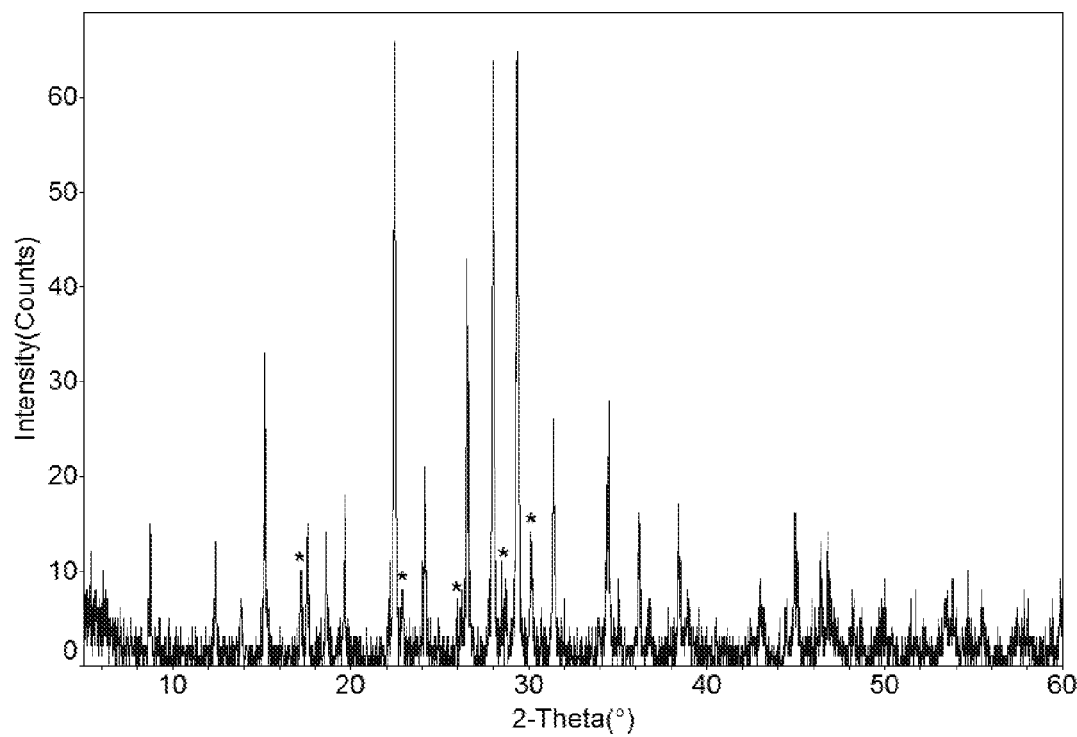
FIG. 11C is an XRD profile for Na$_7$V$_4$(PO$_4$)(P$_2$O$_7$)$_4$ active material produced according to Example 11 of the present, with impurities labeled as follows: *NaVP$_2$O$_7$.

FIGS. 11A and 11B (Cell#204040) show the first cycle constant current data for the $Na_7V_4(P_2O_7)_4PO_4$ cathode active material (X0458, made using the reducing agent, ammonium hypophosphite, $NH_4H_2PO_2$) measured in a metallic lithium half-cell. FIG. 11A shows the voltage profile (electrode potential versus cumulative specific capacity) and FIG. 11B shows the differential capacity profile (differential capacity versus electrode potential). The constant current data shown in the figure were collected using a lithium metal counter electrode at a current density of 0.04 mA/cm$^2$ between voltage limits of 3.0 and 4.4 V. The non-aqueous electrolyte used was a 1 M solution of $LiPF_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 2.941 V vs. Li. Referring to FIG. 11A, it is assumed that sodium ions are extracted from the $Na_7V_4(P_2O_7)_4PO_4$ active material during the initial charging of the cell. During the sodium ion extraction process, a charge equivalent to a material specific capacity of 74 mAh/g was obtained for the cathode active material. It is expected from thermodynamic considerations that the sodium extracted from the material during the initial charging process, enters the electrolyte, and is then displacement 'plated' onto the lithium metal anode (i.e. releasing more lithium into the electrolyte). Therefore, during the subsequent discharging of the cell, it is assumed that a mix of lithium and sodium is re-inserted into the material. The re-insertion process corresponds to 63 mAh/g, indicating the reversibility of the ion insertion reactions. The symmetrical nature of the charge-discharge voltage profile indicates the reversibility of the system. This is further exemplified by the symmetrical nature of the differential capacity profile shown in FIG. 11B.

Example 12

Figure 12A:
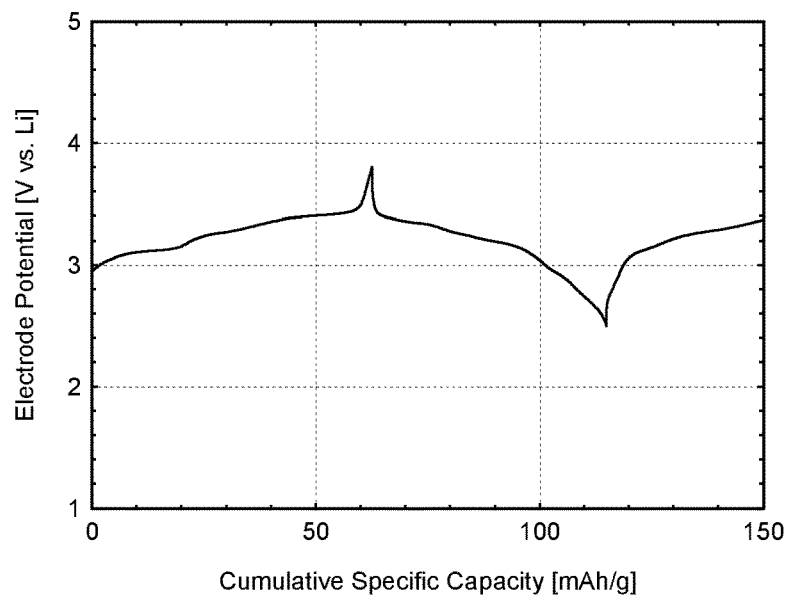
FIG. 12A shows the voltage profile (electrode potential versus cumulative specific capacity) for Na$_4$Fe$_3$(PO$_4$)$_2$P$_2$O$_7$ active material produced according to Example 12 of the present invention.
Figure 12B:
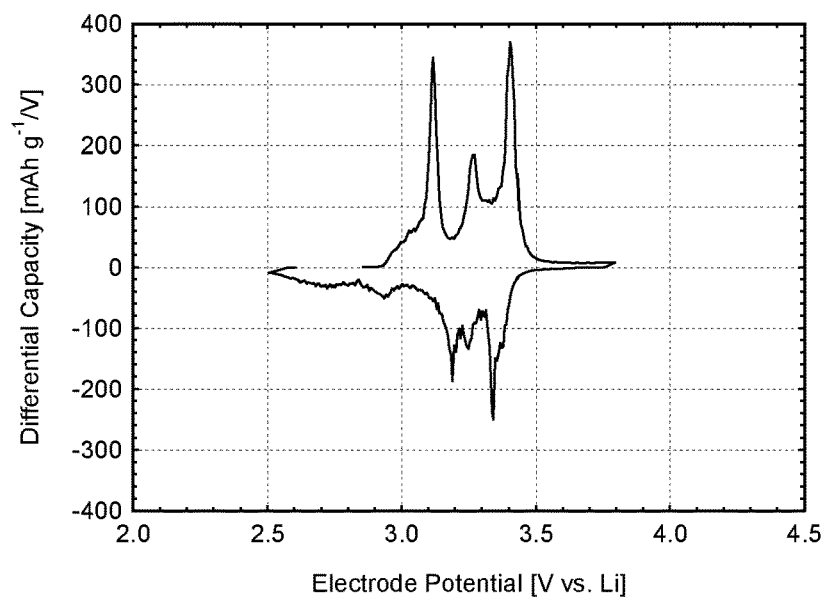
FIG. 12B shows the differential capacity profile (differential capacity versus electrode potential) for Na$_4$Fe$_3$(PO$_4$)$_2$P$_2$O$_7$ active material produced according to Example 12 of the present invention.
Figure 12C:
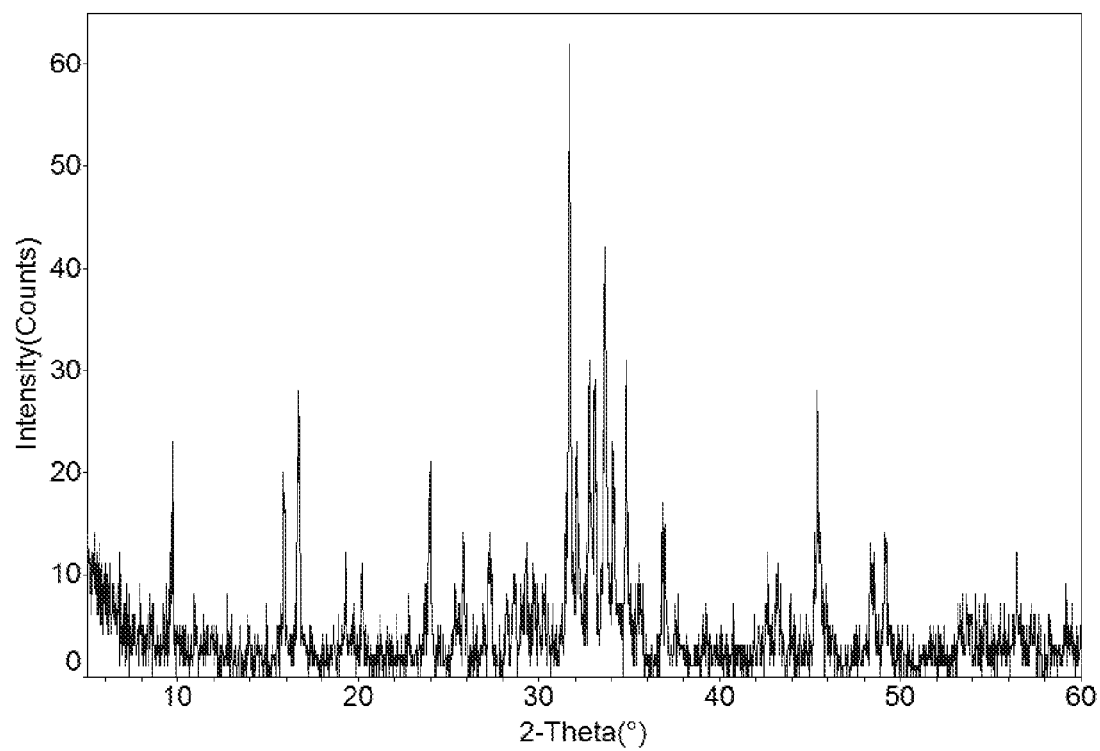
FIG. 12C is an XRD profile for Na$_4$Fe$_3$(PO$_4$)$_2$P$_2$O$_7$ active material produced according to Example 12 of the present invention.

FIGS. 12A and 12B (Cell#212015) show the first cycle constant current data for the $Na_4Fe_3(PO_4)_2P_2O_7$ cathode active material (X0996, made using the reducing agent, sodium hypophosphite, $NaH_2PO_2$) measured in a metallic lithium half-cell.

FIG. 12A shows the voltage profile (electrode potential versus cumulative specific capacity) and FIG. 12B shows the differential capacity profile (differential capacity versus electrode potential). The constant current data shown in the figure were collected using a lithium metal counter electrode at a current density of 0.02 mA/cm$^2$ between voltage limits of 2.5 and 3.8 V. The non-aqueous electrolyte used was a 1 M solution of $LiPF_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 2.843 V vs. Li. Referring to FIG. 12A, it is assumed that sodium ions are extracted from the active $Na_4Fe_3(PO_4)_2$ $P_2O_7$ material during the initial charging of the cell. During the sodium ion extraction process, a charge equivalent to a material specific capacity of 63 mAh/g was obtained for the cathode active material. It is expected from thermodynamic considerations that the sodium extracted from the material during the initial charging process, enters the electrolyte, and is then displacement 'plated' onto the lithium metal anode (i.e. releasing more lithium into the electrolyte). Therefore, during the subsequent discharging of the cell, it is assumed that a mix of lithium and sodium is re-inserted into the material. The re-insertion process corresponds to 52 mAh/g, indicating the reversibility of the ion insertion reactions. The symmetrical nature of the charge-discharge voltage profile indicates the reversibility of the system. This is further exemplified by the symmetrical nature of the differential capacity profile shown in FIG. 12B.

Example 13

Figure 13A:
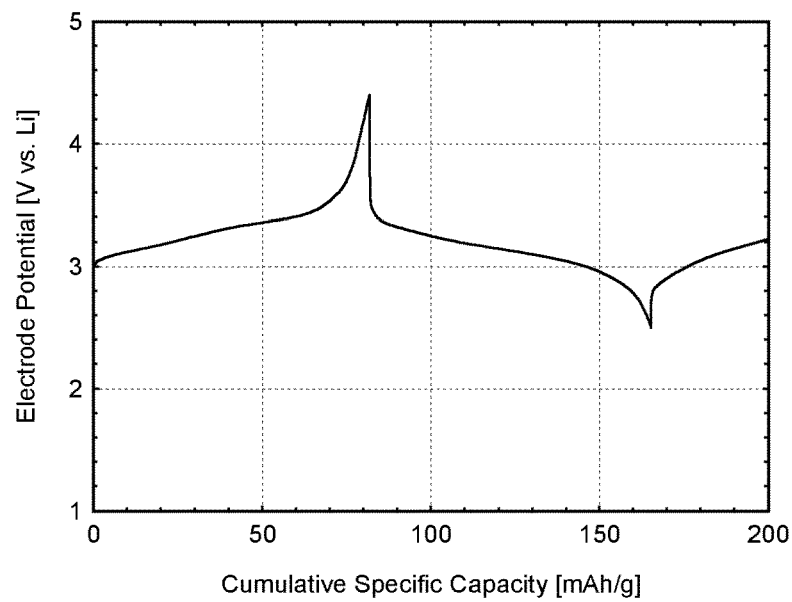
FIG. 13A shows the voltage profile (electrode potential versus cumulative specific capacity) for Na$_{6.24}$Fe$_{4.88}$(P$_2$O$_7$)$_4$ active material produced according to Example 13 of the present invention.
Figure 13B:
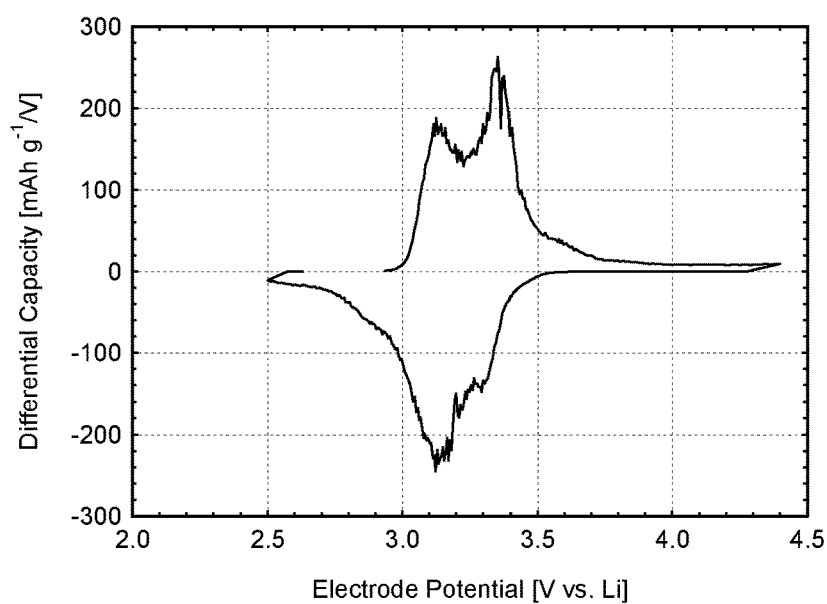
FIG. 13B shows the differential capacity profile (differential capacity versus electrode potential) for Na$_{6.24}$Fe$_{4.88}$(P$_2$O$_7$)$_4$ active material produced according to Example 13 of the present invention.
Figure 13C:
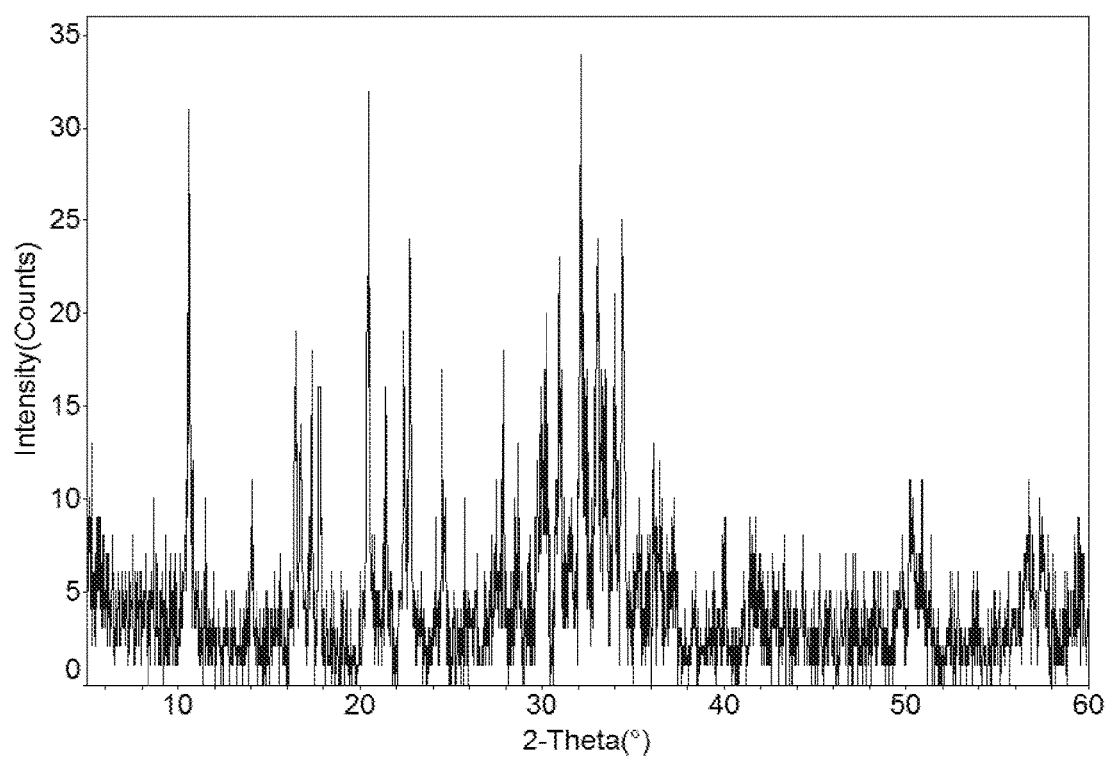
FIG. 13C is an XRD profile for Na$_{6.24}$Fe$_{4.88}$(P$_2$O$_7$)$_4$ active material produced according to Example 13 of the present, with impurities labeled as follows: *NaVP$_2$O$_7$.

FIGS. 13A and 13B (Cell#212008) show the first cycle constant current data for the $Na_{6.24}Fe_{4.88}(P_2O_7)_4$ cathode active material (X0990, made using the reducing agent, sodium hypophosphite, $NaH_2PO_2$) measured in a metallic lithium half-cell.

FIG. 13A shows the voltage profile (electrode potential versus cumulative specific capacity) and FIG. 13B shows the differential capacity profile (differential capacity versus electrode potential). The constant current data shown in the figure were collected using a lithium metal counter electrode at a current density of 0.02 mA/cm$^2$ between voltage limits of 2.5 and 4.4 V. The non-aqueous electrolyte used was a 1 M solution of $LiPF_6$ in a 1:1 mixture of ethylene carbonate (EC) and diethyl carbonate (DEC). The electrochemical testing was carried out at a controlled temperature of 25° C.

The Open Circuit Voltage (OCV) of the as-made cell was 2.922 V vs. Li. Referring to FIG. 13A, it is assumed that sodium ions are extracted from the active $Na_{6.24}$ $Fe_{4.88}(P_2O_7)_4$ material during the initial charging of the cell. During the sodium ion extraction process, a charge equivalent to a material specific capacity of 83 mAh/g was obtained for the cathode active material. It is expected from thermodynamic considerations that the sodium extracted from the material during the initial charging process, enters the electrolyte, and is then displacement 'plated' onto the lithium metal anode (i.e. releasing more lithium into the electrolyte). Therefore, during the subsequent discharging of the cell, it is assumed that a mix of lithium and sodium is re-inserted into the material. The re-insertion process corresponds to 83 mAh/g, indicating the reversibility of the ion insertion reactions. The symmetrical nature of the charge-discharge voltage profile indicates the reversibility of the system. This is further exemplified by the symmetrical nature of the differential capacity profile shown in FIG. 13B.

The invention claimed is:

1. A solid state process for preparing a metal-containing compound comprising the formula:

$$A_aM_b(X_cY_d)_eZ_f$$

wherein:
A is an alkali metal selected from one or more of sodium and potassium;
M comprises one or more metals selected from the group consisting of titanium, vanadium, niobium, tantalum, hafnium, chromium, molybdenum, tungsten, manganese, iron, osmium, cobalt, nickel, palladium, platinum, copper, silver, gold, zinc, cadmium, aluminium, scandium, yttrium, zirconium, technetium, rhenium, ruthenium, rhodium, iridium, mercury, gallium, indium, tin, lead, bismuth, magnesium, calcium, beryllium, strontium barium, boron, silicon, germanium, arsenic, antimony and tellurium;
$(X_cY_d)$ is at least one first anion and is a moiety selected from one or more of $PO_4$ and/or $P_2O_7$; and
Z is at least one second anion
wherein a>0; b>0; c>0; d>0; e>0 and f≧0;
wherein a, b, c, d, e and f are chosen to maintain electroneutrality;
comprising the steps:
a) forming a mixture of starting materials in their solid form, comprising i) one or more M metal-containing precursor compounds, ii) one or more A metal-containing and hypophosphite-containing materials;
b) heating the mixture of starting materials from 150° C. to 1200° C. in the absence of an oxidizing atmosphere to form the metal-containing compound; and
c) recovering the metal-containing compound.

2. The solid state process according to claim 1 wherein Z is selected from one or more of the group consisting of halides, hydroxide-containing groups and mixtures thereof.

3. The solid state process according to claim 1, the metal-containing compounds is selected from the group consisting of $NaFePO_4$, $NaMnPO_4$, $NaCoPO_4$, $NaNiPO_4$, $Na_4Fe_3(PO_4)_2P_2O_7$, $Na_3V_2(PO_4)_3$, $Na_7V_4(P_2O_7)_4PO_4$, $Na_7V_3(P_2O_7)_4$, $NaVPO_4F$, $Na_3V(PO_4)_2$, $NaVOPO_4$, $Na_{8-2x}Fe_{4+x}(P_2O_7)_4$, $Na_{8-2x}Mn_{4+x}(P_2O_7)_4$, $Na_2MnP_2O_7$, $Na_2FeP_2O_7$, $Na_2CoP_2O_7$, $Na_4Mn_3(PO_4)_2P_2O_7$, $Na_4Co_3(PO_4)_2P_2O_7$, $Na_4Ni_3(PO_4)_2P_2O_7$, $Na_2FePO_4F$, $Na_2MnPO_4F$, $Na_2CoPO_4F$ and $Na_2NiPO_4F$, wherein x is the range 0≤x≤4.

4. The process according to claim 1, wherein the one or more of the metal-containing precursor compounds is reduced by the one or more A-metal containing and hypophosphite-containing materials.

5. The solid state process according to claim 1, wherein M is one or more metals selected from the group consisting of manganese, iron, cobalt, nickel, copper, zinc, magnesium and calcium; $(X_cY_d)$ is $PO_4$; a is 1; b is 1; c is 1; d is 4; and f is 0.

6. The solid state process according to claim 1, wherein M is iron; $(X_cY_d)$ is $PO_4$; a is 1; b is 1; c is 1; d is 4 and f is 0, and the one or more metal-containing precursor compounds is selected from the group consisting of $Fe_2O_3$, $Fe_3O_4$, $FePO_4 \cdot xH_2O$, $FePO_4$, $Fe_3(PO_4)_2$, $FeSO_4 \cdot xH_2O$, $Fe(NO_3)_3$, $Fe(CH_3CO_2)_2$, $C_6H_8O_7 \cdot xFe^{3+} \cdot yNH_3$ (ammonium iron (III) citrate), $C_6H_5FeO_7$ (iron (III) citrate), and $Fe(C_5H_7O_2)_3$ (iron (III) 2,4-pentanedionate).

7. The solid state process according to claim 1, wherein the one or more A-metal containing and hypophosphite-containing materials is sodium hypophosphite ($NaH_2PO_2$).

8. The solid state process according to claim 1, wherein the mixture further comprises one or more conductive materials.

9. The solid state process according to claim 1, further comprising forming one or more conductive materials during the heating step (b).

10. The solid state process according to claim 9, wherein at least one of the conductive materials formed during the heating step (b) comprises phosphorus.

11. The solid state process according to claim 10, wherein at least one of the conductive materials formed during the heating step (b) comprises one or more of a transition metal phosphide, a non-transition metal phosphide, alkaline earth metal phosphide or a metalloid phosphide.

12. The solid state process according to claim 1, wherein the mixture further comprises one or more non-metal-containing reactants.

13. The solid state process according to claim 1, wherein the one or more A-metal containing and hypophosphite-containing materials is oxidized and incorporated into the metal-containing compound.

* * * * *